United States Patent [19]
Cox et al.

[11] Patent Number: 5,434,920
[45] Date of Patent: Jul. 18, 1995

[54] SECURE TELECOMMUNICATIONS

[75] Inventors: Richard V. Cox, New Providence, N.J.; Michael M. Kaplan, Rockport, Mass.

[73] Assignee: AT&T Corp., Murray Hill, N.J.

[21] Appl. No.: 113,376

[22] Filed: Aug. 27, 1993

Related U.S. Application Data

[63] Continuation-in-part of Ser. No. 803,809, Dec. 9, 1991, Pat. No. 5,392,357.

[51] Int. Cl.$^6$ ............................ H04L 9/00; H04M 1/68
[52] U.S. Cl. .......................................... 380/49; 380/41; 379/243; 379/258
[58] Field of Search .................... 380/9, 41, 49, 50; 379/243, 258, 257

[56] References Cited

U.S. PATENT DOCUMENTS

| | | | |
|---|---|---|---|
| 4,322,745 | 3/1982 | Sacki et al. | 358/123 |
| 4,815,128 | 3/1989 | Malek | 380/9 |
| 4,864,566 | 9/1989 | Chauveau | 370/109 |
| 4,914,696 | 4/1990 | Dudczak et al. | 380/21 |
| 4,972,479 | 11/1990 | Tobias, Jr. et al. | 380/33 |
| 5,136,648 | 8/1992 | Olson et al. | 380/50 |
| 5,222,136 | 6/1993 | Rasmussen et al. | 380/9 |

FOREIGN PATENT DOCUMENTS

| | | | |
|---|---|---|---|
| 0225756 | 6/1987 | European Pat. Off. | H04L 9/00 |
| 11955/78 | 7/1981 | United Kingdom | H04M 1/70 |

OTHER PUBLICATIONS

Product advertisement for "Hello Direct Handset Amplifier", p. 24 of Hello Direct catalog dated Winter 1993.
Product advertisement for "Universal Telephone REcorder", p. 31 of Hello Direct catalogg dated Winter 1993.
Product advertisement for "DataDapter" by Konexx, p. 37 of Hello Direct catalog dated Winter 1993.
Product advertisement for "Linc Up".
Product data sheet for Embeddable Privacy Unit (Analog Scrambler) by Datotek.

*Primary Examiner*—Gilberto Barró, Jr.
*Attorney, Agent, or Firm*—Thomas A. Restaino

[57] ABSTRACT

A security node disposed in the telecommunications network connecting calling and called parties transforms information (which can be voice, data, facsimile, video and other types of calls or messages) encrypted in a first format to (a) encrypted information in a different format or to (b) non-encrypted information, and vice-versa. The node is accessible from any location connected to the network. By routing calls or messages originated by the calling party and destined for the called party via the security node, and providing appropriate control signals to the node, the information may be encrypted only over a portion of the transmission path between the parties, and clear over the remainder of the transmission path. Alternatively, the information may be encrypted in different portions of the path using different encryption algorithms. This arrangement enables the parties to obtain relatively secure communications even if only one party has a security device at the originating or terminating end, or if the parties have security devices using different handshaking protocols and encryption algorithms.

11 Claims, 14 Drawing Sheets

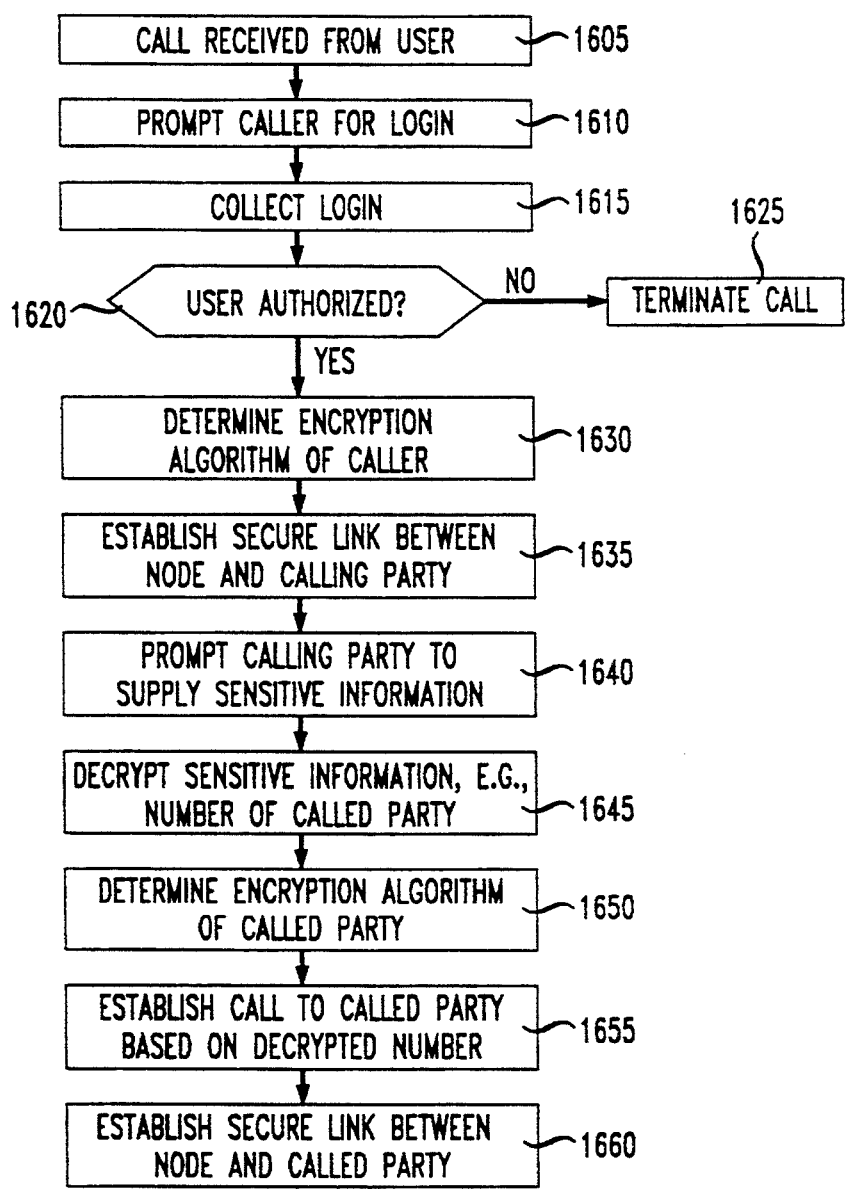
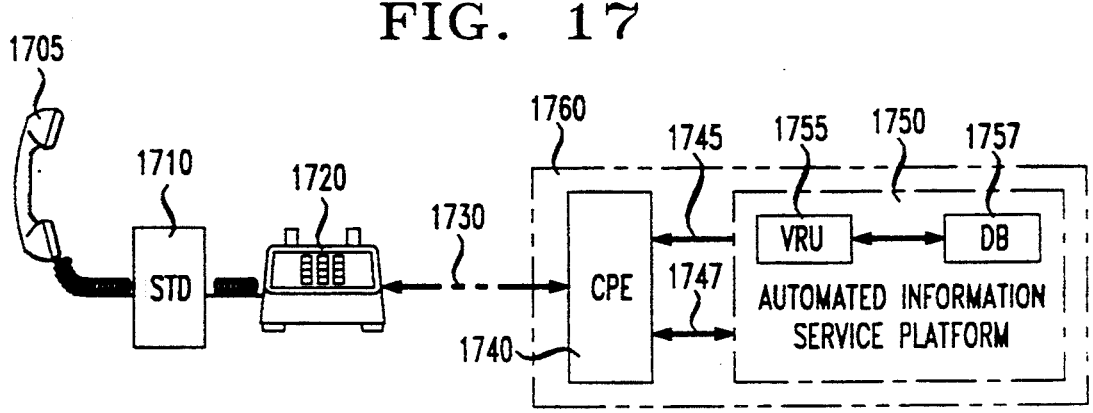

SECURE TELECOMMUNICATIONS

CROSS-REFERENCE TO RELATED APPLICATION

This application is a continuation-in-part of commonly assigned U.S. patent application, Ser. No. 07/803,809, filed Dec. 9, 1991, U.S. Pat. No. 5,392,375.

TECHNICAL FIELD

This invention relates generally to secure telecommunications involving voice, data, facsimile, video and other information.

BACKGROUND OF THE INVENTION

Over the past several years, a great deal of emphasis has been placed on increasing the security of telecommunications systems, so that unauthorized persons cannot intercept and access voice, data, facsimile, video or other information not intended for them. Studies have shown that the commercial markets are well aware of the threats to their communications systems and have a clear sense of the business applications which are at risk because of potential breakdowns in security. The reasons for the heightened interest are many, including the increased use of cellular telephony in which a portion of the conversation is carried over the air and is thus more susceptible to attack, and the fact that other portions of the telecommunications network can be particularly susceptible to security breaches; i.e., wiring closets, junction boxes, manhole or telephone pole connections, facsimile machines, and especially cordless and cellular phones.

SUMMARY OF THE INVENTION

In accordance with an illustrative embodiment of the present invention, secure communications between calling and called parties is accomplished with use of a secure telephone device (STD). An STD disposed between the handset and the base of each party's telephone converts a conventional non-secure telephone call to a secure call by encrypting speech to be transmitted to a party and by decrypting speech received from that party. Illustratively, each party's STD comprises a speech coder (and decoder) (codec), a cryptographic system, and a modem. Both the o modem and the speech codec are suitably interfaced to the telephone base and handset of the party, respectively.

In accordance with the illustrative embodiment, a secure telephone call between two parties having STDs is predicated on an existing non-secure call over a telephone network. Given an STD in combination with a telephone, a calling party establishes a non-secure telephone call in conventional fashion (for example, by generating DTMF signals with the keypad of the telephone base to identify the called party). At the outset of such a call, the STD of each party is in non-secure mode and therefore acts only as a conduit for speech signals to and from a telephone handset. Either party to the non-secure call may initiate a conversion of the call to a secure call by signalling for the initiation of training and cryptographic key exchange sequences between the cryptographic systems of the two STDs involved in the call. Such signalling is provided with use of a user interface of the STD.

Once in secure mode as a result of such sequences, the speech of each party is encrypted to ensure its security. When a party speaks an utterance, that lo party's audible words are converted into electrical signals by a microphone in the party's telephone handset. These signals are received by the STD through an appropriate microphone interface and compressed by the STD's speech coder. Compressed speech signals are then provided to the cryptographic system of the STD. The cryptographic system encrypts the compressed speech signals in accordance with the cryptographic key exchanged between STDs. Encrypted speech signals output from the cryptographic system are modulated by the modem of the STD. The modulated signals are provided to the telephone base of the speaking party via the telephone base interface of the STD. These signals are then transmitted in conventional fashion over the telephone network to the other party on the call.

Modulated signals received from the network at a party's telephone base are provided to the STD of the party via the STD telephone base interface. These received signals are first demodulated by the modem of the receiving STD. The resulting demodulated signals reflect encrypted compressed speech generated by the other party to the call. The encrypted compressed speech is then decrypted by the cryptographic system of the STD to yield signals reflecting compressed speech. The compressed speech signals are then decompressed by a speech decoder of the STD. Decompressed speech is then provided to the listening party's telephone handset speaker via the handset interface of the STD.

Illustratively, the speech codec of the STD is a CELP speech codec. The cryptographic system conforms to the Federal Information Processing Standard 140-1. The user interface of the STD includes a keypad for generating control or information signals to be encrypted; switches to control whether the STD is in secure mode; and a display to indicate, for example, STD status (alternatively, such information could be provided to the user through LEDs or audible messages played through a handset).

In other illustrative embodiments, the STD may be used to encrypt information signals from various communication devices such as a fax machine, computer, data terminal, etc. Moreover, the STD may be used with conventional speaker phone devices in place of a conventional handset.

According to one illustrative embodiment, the STD includes a removable interface module. This module contains the interfaces needed to adapt the STD for a particular operational environment, such as a particular telephone base and handset which present a particular set of electrical characteristics to the STD. In order that the STD have the capability of functioning with various telephone bases and handsets (i.e., in order that the STD be able to function with devices of varying characteristics), STD interfaces to its environment are contained in the removable (i.e., replaceable) modules. Each module provides a set of interfaces to allow the STD to function with, for example, one or more telephone base and handset combinations of similar characteristics. When a user desires to move an STD to a telephone set with base and handset characteristics different from those of the previous telephone set used with the STD, all that is required for STD-telephone electrical compatibility is to change interface module to one which accommodates the new telephone set. Other related embodiments include removable interface modules for adapting the STD for operation with other devices such as computers, fax machines, etc.

Various services may be provided with use of the STD. Illustratively, the STD may be used in a "totally secure phone call" service. According to this service, a user who wishes to place a totally secure call to a called party first calls a node of a communications network. The node includes a cryptographic system compatible with the user's STD. Once an ordinary non-secure call is established between the calling party and the node, the calling party (or the node) initiates a secure connection with the node (or the calling party) by training and cryptographic key exchange techniques. After the secure connection is established, the calling party may transmit a telephone number of the called party to the node. This called party telephone number may be entered by the calling party with use of a keypad on a user interface of the STD. The node responds to this information by placing a call to the called party at the number supplied by the calling party. The call to the called party may be a non-secure call or converted to a secure call if the called party has an STD. Once the call to the called party is made, the node may couple (or "bridge") the two calls allowing the calling party and called parties to converse. The phone call is totally secure because not only is the speech of the parties encrypted, but the telephone number of the called party is communicated in encrypted form.

Another use for the STD is in the secure communication of personal information. Illustratively, personal information which is to be sent to a system or device over a telephone line may be communicated in encrypted form with use of an STD. A secure connection may be made with the receiving device (which includes a cryptographic system) by establishing a conventional non-secure connection with the device and then converting the connection to a secure connection by the techniques discussed above. At this point, personal information, which may be, for example, a personal identification number, social security number, or the like, may be communicated to the device via the secure connection. Such personal information may be entered with use of the keypad on the STD.

The STD may also be used in a secure voice messaging system or service. According to an illustrative embodiment, a calling party who accesses a voice messaging system in conventional fashion may communicate a message in encrypted form. If the voice messaging system includes a cryptographic system which is compatible with the calling party's STD, the calling party (or the system) may initiate a conversion of the non-secure call to the voice messaging system to a secure call as described above. Once the secure call is established, the calling party may leave a message for a recipient knowing that the message has been communicated securely to the messaging system. A recipient, using a similar procedure, may securely retrieve stored messages at a telephone having an STD.

BRIEF DESCRIPTION OF THE DRAWINGS

In the drawing,

FIG. 16 presents a flowchart summarizing the illustrative operation of a security node facilitating a totally secure telephone call service.

FIG. 17 presents a system for providing secure personal information over the telephone line to an illustrative information service platform.

DETAILED DESCRIPTION

Figure 1:
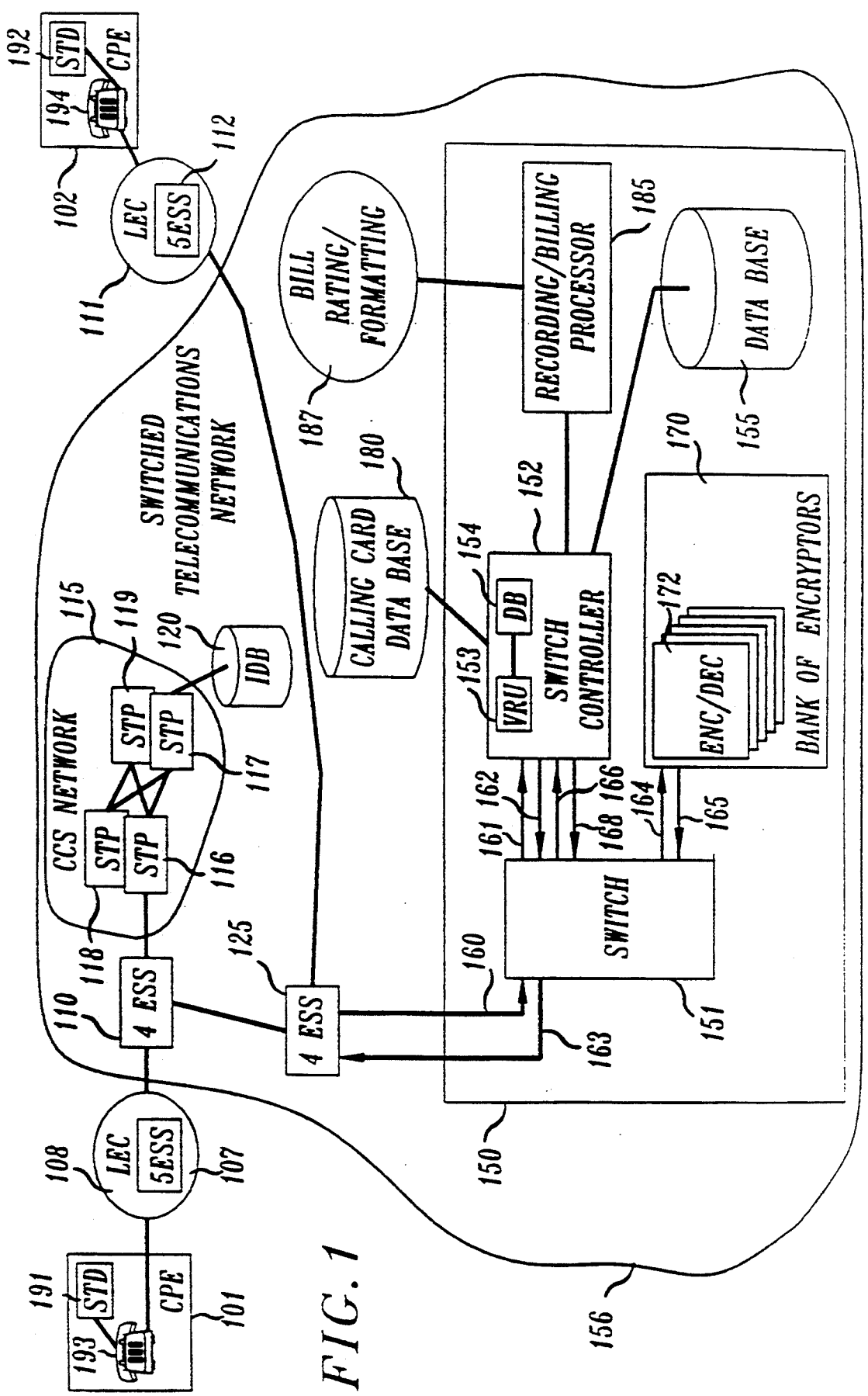
FIG. 1 is a block diagram illustrating a security node arranged in accordance with the present invention.

Referring first to FIG. 1, there is shown a block diagram illustrating the arrangement of a security node 150 constructed in accordance with the present invention, and its relationship with various components of local and interexchange telecommunications networks. Security node 150 is designed to effect communications such that (a) information carded in a portion of the transmission path (e.g., the portion between the calling party and node 150) can be secure, while information carried in another portion of the transmission path (e.g., between node 150 and the called party) is clear; or (b) information carded in the portion of the transmission path between the calling party and node 150 can be encrypted using a first encryption algorithm, while the information carried in the portion of the transmission path between node 150 and the called party is encrypted using a second, different, encryption algorithm.

In FIG. 1, communications originated by a calling party using near side customer premise equipment (CPE) 101 are destined for a called party using far side CPE 102, and vice versa. As used herein, "communications" may include analog or digital calls or messages that convey voice, data, facsimile, video or other information. Hereinafter, communications may be referred to simply as calls. CPE 101 and 102 may each include a commercially available secure telephone unit (STU), such as the STU-III telephone available from AT&T, or another secure terminal available from a vendor such as Motorola or General Electric. Alternatively, CPE 101 and/or CPE 102 may respectively include a secure telephone device (STD) 191,192, i.e., an adjunct, that connects to an associated telephone 193, 194, or to a fax machine, data terminal, or other communication device. Note that there is no requirement that CPE 101 or STD 191 be of the same type as CPE 102 or STD 192; indeed, they can be obtained from different manufacturers, use different encryption algorithms or handshaking protocols. Also, either CPE 101 or CPE 102 (but not both) can be an ordinary (non-secure) terminal or device.

For the purposes of further explanation, CPE 101 is assumed to be arranged to transmit and receive outbound (i.e., from the calling party to the security node) and inbound (i.e., from the security node to the called party) calls that can be either clear or secure. Switches in CPE 101 control the mode, clear or secure, in which the equipment operates; mode changes are made either locally, under direct user control, by actuating the switches or alternatively, in response to a remotely generated signal. For convenient data entry, CPE 101 may be equipped with a touch tone generator and a keypad; status indications can be given to the user through one or more display indicators, such as LED display lamps. For the purposes of the immediately following description, it is assumed that CPE 102 is a conventional telephone, since secure-to-clear communications are described first. Later in the detailed description, secure-to-secure communications are described.

While telecommunications "access" to security node 150 can be gained by any convenient access mechanism, such as by using (a) a software defined network (SDN) access number; or (b) a POTS (plain old telephone service) number in conjunction with a premium service such as MEGACOM available from AT&T; or (c) an 800 number, it is assumed, for the purposes of explanation, that a calling party using CPE 101 gains access to node 150 by dialing a predetermined toll-free number, such as 1-800-ENCRYPT. When that number is dialed, the call is routed through a switch 107 (e.g., a #5ESS® electronic switch available from AT&T) in a local exchange carder (LEC) office 108 serving the calling party, to an interexchange carder switch 110, typically an AT&T #4ESS Action Control Point (ACP) that is part of a switched telecommunications network that is designated generally as 156. Switch 110 responds by generating a signaling message (usually in the CCS7 signaling format) and routing it through a common channel signaling (CCS) network 115 including a plurality of interconnected Signal Transfer Points (STPs) 116, 117, to an InWATS Data Base (IDB) 120, or to a network control point (NCP) in a software defined network, depending upon the subscription plan of the calling party. IDB 120 contains records for each dialed 800 number, and performs a look-up operation in order to generate a routing number associated with the dialed number, which is sent back to switch 110. In response to the routing number, switch 110 in turn routes the call to security node 150, usually through other components of switched telecommunications network 156, which may include another #4ESS switch 125. It is to be noted that a calling party may be connected directly to LEC office 108, as shown in FIG. 1, or connected via a PBX switch or other customer premises equipment, not shown. It is also to be noted that other access and signaling arrangements may be used to interconnect CPE 101 with security node 150.

When the call is received in security node 150, the node may also receive from switch 107, 110 or 125, a CCS message containing the dialed number and automatic number identification (ANI) information identifying CPE 101. However, the availability of such information depends upon the capabilities of the specific switches and signaling equipment being used by LEC office 108 and network 156. For the purposes of the following explanation, it will be assumed that calling party information is not available without prompting the caller.

As shown in FIG. 1, security node 150 includes a switch 151, which may, for example, be a Definity (TM) digital PBX available from AT&T, that is arranged to connect incoming calls received on trunk 160 to an available port of a switch controller 152, via a line in line group 161. Switch 151 is also arranged to connect calls to available encryptors in an encryptor bank 170, via line group 164. A bus 162 between switch 151 and controller 152 enables communication of control signals. Controller 152, which may be a Conversant® system available from AT&T, includes a voice response unit (VRU) 153 that can transmit voice prompts to the calling party, in accordance with a script stored in a local database (DB) 154. Controller 152 can also perform a variety of other functions by itself or in combination with switch 151. For example, it can receive and logically process information entered by the caller in response to prompting, in conjunction with information retrieved from database 164. Such information can be entered by the caller using the touch tone dialing pad which is normally part of CPE 101, or via a keyboard or other separate input device. In some cases, information can be input as voice responses that are interpreted using "speech to text" processing capabilities. In addition, controller 152, in conjunction with switch 151, can (a) initiate (or command switch 151 to initiate) calls by generating dialing sequences and applying such sequences to switch 151, (b) simultaneously receive and process calls at several inputs, and (c) bridge (or command switch 151 to bridge) incoming and outgoing calls together. Controller 152 can also remain in the call path for a specified time or interval in order to detect and act upon control signals applied to the call path by either the calling or called parties. All of the foregoing functions are available in the Conversant system mentioned above, and in similar systems available from other vendors.

The process followed in controller 152 when a call is received from a calling party that dialed the number of node 150 (e.g., 1-800-ENCRYPT), desiring to effectuate secure-to-clear communication (i.e., secure between CPE 101 and security node 150 and clear between security node 150 and the called party), is shown in flow diagram form in FIG. 2 and summarized as follows: o Upon receipt of a call (step 201 ), switch controller 152 prompts the caller (step 203) for information needed to complete the call. This may include information identifying the calling party as a subscriber, e.g., a "login"; information verifying the identity of the calling party, e.g., a password; and information identifying the called party, e.g., the telephone number of CPE 102.

At this point in the process, information identifying the "type" of encryption being used by the calling party may also be received in controller 152 in response to a voice prompt. However, it may be preferable to automate the provision of this information, such as by including a code indicative of the encryption type in the "begin secure transmission" signal exchanged before encryption begins. It is to o be observed, however, that the encryption "type" may alternatively be obtained at a subsequent point in the set-up process as discussed more fully below. For the purposes of the following description, it is assumed that the encryption type is obtained in step 205, and stored in database 154. In any event, it is noted here that "type" information is required because node 150 is arranged to support customers that use a variety of different CPE that incorporate and use different encryption algorithms. Accordingly, the details of the specific type of encryption used by the calling party is required in order to effectuate appropriate processing in node 150.

Upon receipt of caller-entered information, controller 152 checks database 155 (step 207) to see if the caller is an authorized user. If unauthorized, controller 152 plays a terminating announcement in step 209 while if authorized, controller 152 continues to collect information entered in response to the remaining prompts. In addition, controller 152 sends calling party identification and called party information to a recording and billing processor 185 in order to initiate the billing process (step 211). Processor 185 periodically communicates with an automatic bill rating and formatting system 187 which records call details for subsequent bill procession (step 213). Call details may include date, time and duration of session, number called, etc. The billing process is shown in FIG. 2 as continuing independently of the "main" call set-up and encryption process involving node 150.

When controller 152 has determined the type of encryption being used in CPE 101, a lookup operation is performed in database 154 (step 215) to determine a hunt group designation associated with selected encryptors within bank of encryptor bank 170 that use encryption algorithms that can effectively process (i.e., decrypt) encrypted signals generated in CPE 101. Since several calls using the same encryption type can be processed at the same time, encryptor bank 170 contains several such encryptors, each of which has an individual access number in the same hunt group.

Controller 152 then outpulses control signals (generally tones) to switch 151 on line 162, representing the hunt group associated with the selected encryptor type being used by the caller. When the hunt group is called, the next available encryptor of the appropriate type (e.g., encryptor 172 in FIG. 1) is selected by switch 151. However, if no encryptor of the selected type is available (step 217), the process is terminated (step 209).

When a particular encryptor is selected, its input end (with respect to calls generated in CPE 101) is connected to switch 151 via line 164 (step 219). Note that in the forward direction, i.e., from CPE 101 to CPE 102, encryptor 172 is actually operating to decrypt calls that have been encrypted in CPE 101, so that such calls can be extended to CPE 102 from node 150 in the clear.

Because the encryptors within encryptor bank 170 may themselves contain little communications signaling capability, each encryptor, including encryptor 172, can be arranged so that its output end (with respect to calls generated in CPE 101) is connected to a line side termination in switch 151, in order to allow signaling to be performed by controller 152. Specifically, when encryptor 172 is selected, its output end is connected to line 165 in switch 151, thereby supplying dial tone to controller 152.

In response to receipt of dial tone, switch controller 152 is arranged to generate dialing signals that are applied to switch 151 and cause that switch to initiate a second call to controller 152 (step 221). This call, which is extended from switch 151 to controller 152 via line 166, is desirable since it enables the controller to continue to monitor calls in the clear mode (i.e., not encrypted) after the call setup process has been completed. As explained more fully below, the first connection through controller 152, which is dropped after call setup is completed, places the controller in a position in the call flow sequence such that encrypted (rather than clear) voice/data is received.

Controller 152 is now in a position to complete the call to CPE 102. This is done by placing the incoming call (i.e., the call from CPE 101 to controller 152 via encryptor 172) on hold and initiating a new call (step 223) to the called party number that was provided earlier and that is stored in database 154. Routing of this call is from controller 152 to switch 151 via an line 168. From switch 151, the call is routed to switch 125 via trunk 163 and then through telecommunications network 156 to the intended destination, CPE 102, using conventional call set-up and signaling procedures. Egress from security node 150 to the called party may be provided through MEGACOM ® service, SDN, or other outbound service (i.e., PRO WATS, WATS or Business Long Distance available from AT&T). The connection between telecommunications network 156 and CPE 102 is typically made through a second LEC office 112, which includes a terminating #5ESS switch 111.

When the called party answers, answer supervision is detected in switch 125 and passed through switch 151 to controller 152. In response, controller 152 is arranged to signal switch 151 to bridge (step 225) the call To controller 152 (on line 161) with the call FROM controller 152 (on line 162). This removes one "appearance" of controller 152 from the call path, but leaves the second appearance intact. This allows controller 152 to continue to "monitor" the call (step 227) for the occurrence of control signals (touch tone signals or voice, which are clear, rather than encrypted) after an end to end connection is made, so that certain other actions, described below, can be taken during the progress of a call.

Communications in the reverse direction, i.e., from the called party (CPE 102) to the calling party (CPE 101), once the call path has been set up in switch 151, follows the same path and uses encryptor 172 as an encryption (rather than a decryption) unit for the return direction.

Figure 3:
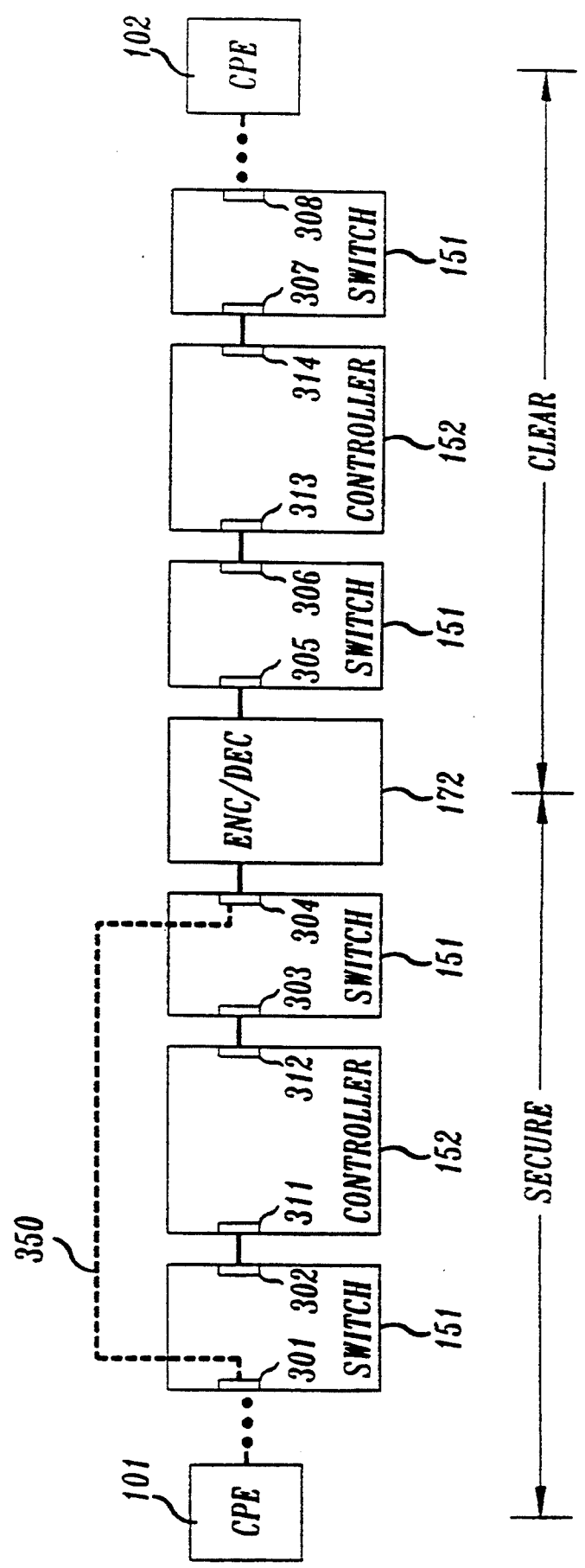
FIG. 3 is a hardware flow diagram useful in explaining the process for initiating secure-to-clear communications and illustrating the path through some of the components of FIG. 1 for such calls or messages.

Before describing the training sequence used to effect secure communications between the calling party and node 150, it will be instructive to describe the call setup process in an alternate form, in conjunction with FIG. 3, in which the same designations are retained for the various components in FIG. 1. However, the call flow is shown in a "linear" form, i.e., the multiple appearances of switch 151 and controller 152 have been "unwrapped".

In FIG. 3, a call initiated by CPE 101 is routed through the local and toll networks, including, for example, switches 107, 110 and 125, which are not shown in FIG. 3, and arrives at a first input port 301 of switch 151 (step 201), which routes the call to a first input port 311 of controller 152 via its output port 302. After the controller has obtained sufficient information to determine the type of encryption that may be performed in CPE 101, (steps 203,205), a connection is made by controller 152 to one of the encryptors (illustratively encryptor 172) in encryptor bank 170 (steps 207, 215, 217). This connection is made by (1) controller 152, at its output port 312, seizing an available input (port 303) in switch 151, and (2) dialing the hunt group number associated with the appropriate type of encryptor. This causes switch 151 to route the call from an output port 304 to encryptor 172 (step 219).

The output side of encryptor 172 is connected to an input port 305 of switch 151 (step 221), which provides a dial tone back to controller 152. Upon receipt of this dial tone, controller 152 outputs from port 312 the signals (e.g., digits) required to connect the call to its destination, via a second connection through controller 152 (step 223). While this connection can be established in several ways, the following procedure is preferred: First, the digits output from port 312 cause switch 151 to initiate a call and thereby to connect its input port 305 to an output port 306 that is, in turn, connected to a second input port 313 of controller 152. Controller 152, in turn, receives the output signals (digits) and initiates a new call through switch 151 by providing the control signals indicative of the dialed number from its output port 314 to an available input port 307 of switch 151. This call is initiated when switch 151 connects port 307 to an output port 308 that is in turn connected to switch 125 in the switched telecommunications network 156.

When answer supervision is received from the called party using CPE 102, a clear communication path has been established from CPE 101 through node 150 to the called party CPE 102. At this point, controller 152 signals switch 151 to bridge the call input at port 301 with the call output at port 304 (step 225). This establishes a bypass 350 around one appearance of controller 152, but allows the second appearance of that controller to remain in the clear portion of the call path, in order to monitor the call (step 227) and detect control signals or call status conditions and, in response, perform various other call setup and/or maintenance functions.

Figure 2:
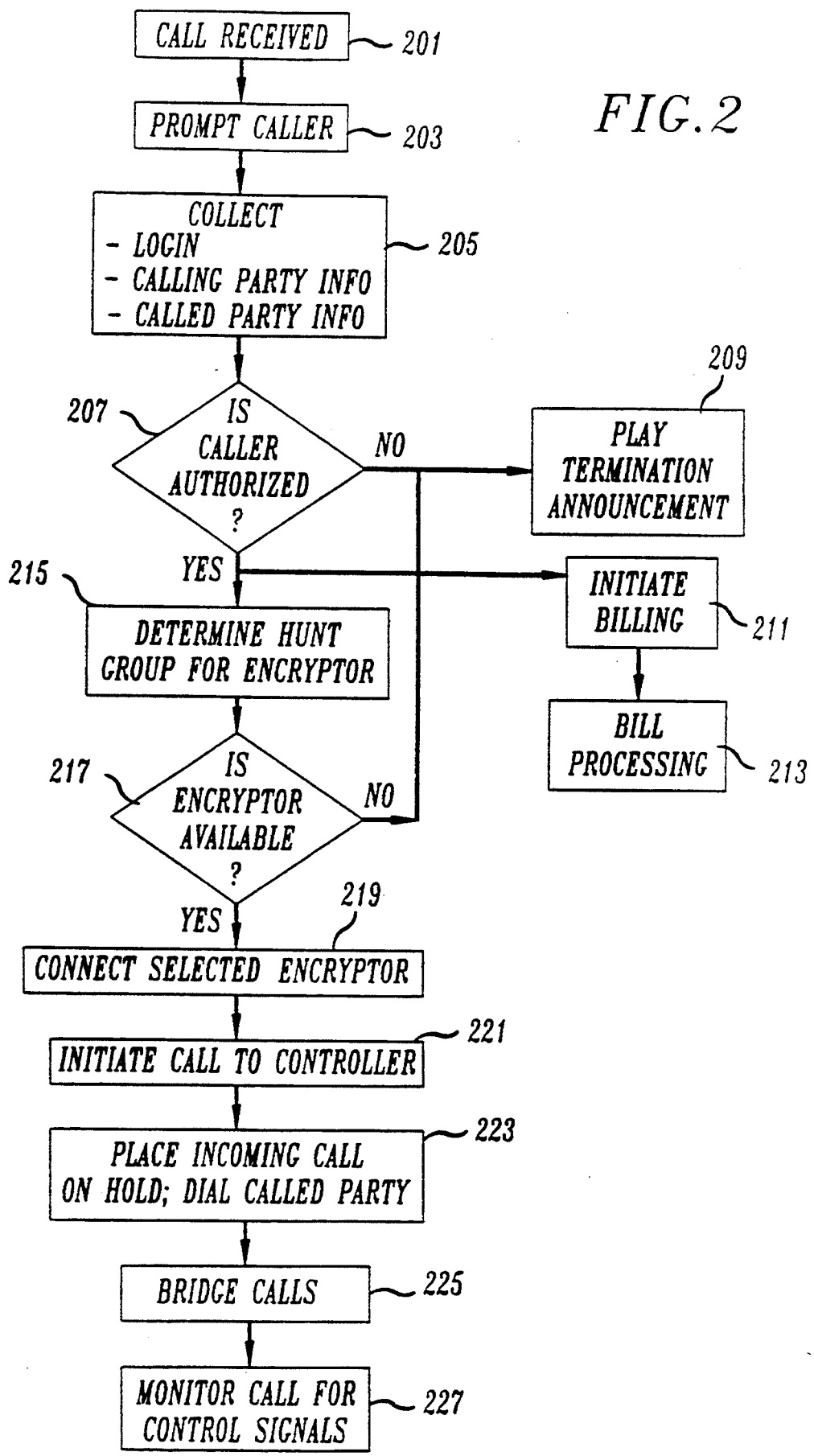
FIG. 2 is a flow diagram illustrating the steps followed in controller 152 of FIG. 1 to set up a 37 secure-to-clear" communication path, i.e., a secure connection between a calling party (CPE 101) and the security node and a clear connection between the security node and the called party (CPE 102)
Figure 4:
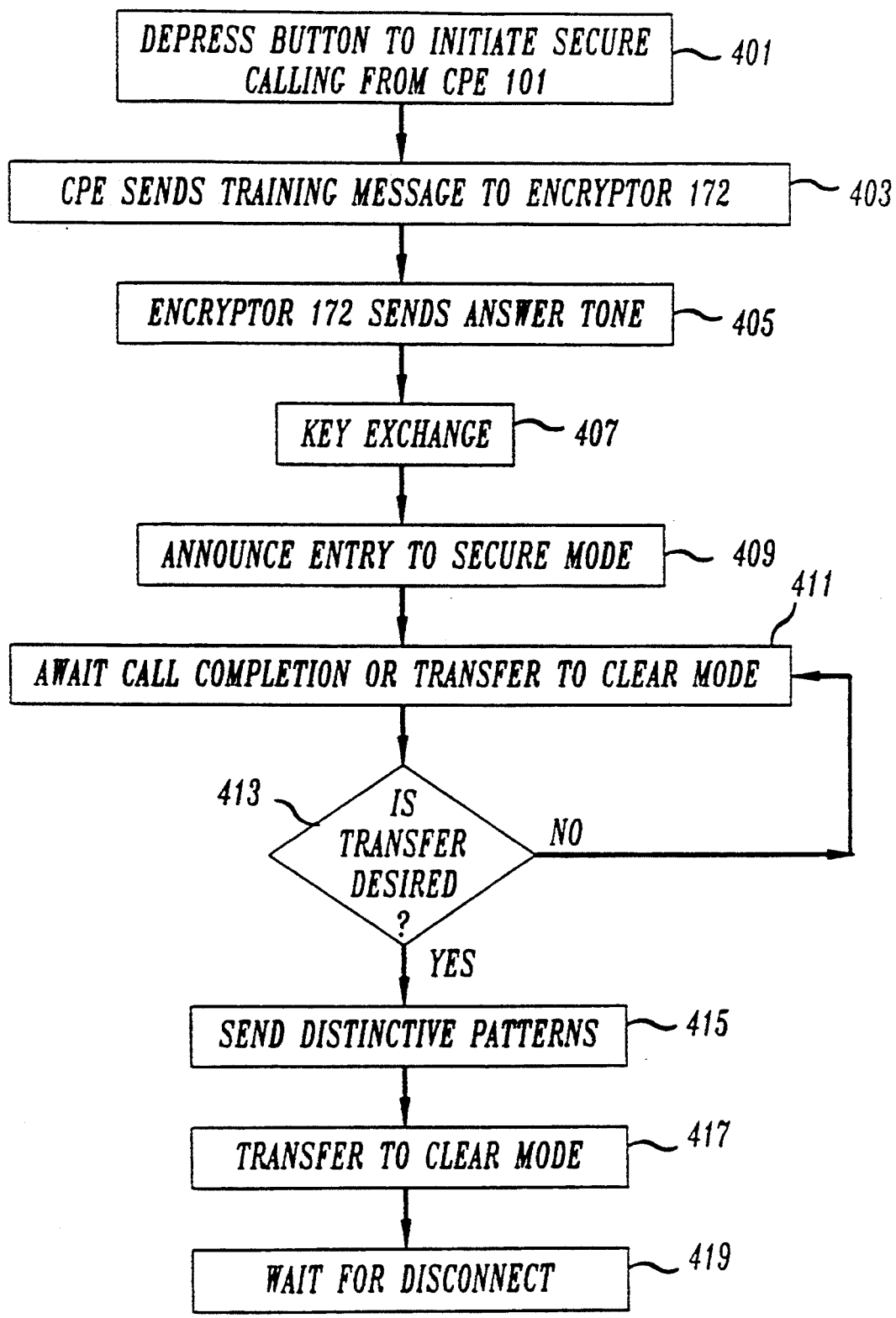
FIG. 4 is a flow diagram illustrating the handshaking steps followed in encryptors in encryptor bank 170 and in CPE 101 and 102.

The process described in conjunction with FIG. 2 establishes a clear communication path between CPE 101 and CPE 102 via security node 150. At some time during the call, the calling party may decide to encrypt the portion of the call between CPE 101 and node 150. The training sequence process by which communication between CPE 101 and security node 150 can be switched from clear to encrypted is shown in FIG. 4, which should be read with continuing with reference to FIG. 3. When the calling party wishes to begin encrypted communication, he or she notifies the destination party of this intent and then institutes transfer to the secure node by, for example, pushing a "secure calling" button on CPE 101 (step 401), thereby triggering the encryption unit within CPE 101 to send a message similar to a modem training message to encryptor 172 in encryptor bank 170 (step 403). In response, encryptor 172 sends a modem answer signal (step 405) to CPE 101. Some indication at CPE 101, such as a flashing indicator light associated with the secure calling button, may be used to indicate that training with encryptor 172 is ongoing.

When the initial training is complete, a key exchange sequence is initiated (step 407), using well known data communications protocols preparatory to establishing secure communications. One such protocol is described in ANSI standard X9.17, but numerous other techniques are well known to persons skilled in the art. If desired, the called party can receive an announcement, generated by controller 152, during encryption training. Upon successful completion of the key exchange, CPE 101 may be arranged so that the secure indicator light stops flashing and remains lit. Controller 152 may detect the completion of training the key exchange sequences, such that an announcement may then be played to the called party (step 409), indicating that the call is going into the secure mode. Once in the secure mode, the call flow continues through encryptor 172 and controller 152 for the duration of the call (step 411).

If the calling party wishes to change from the secure to the clear mode, the clear button on CPE 101 may be pressed. This signal is detected in encryptor 172 (step 413), which responds by changing into the clear mode. This change to clear mode may be effected by CPE 101 sending (step 415) a distinctive data pattern, normally not occurring in encrypted data (e.g., a repetitive pattern such as 001100110011001100011 . . . ), signaling a request to transfer the call to the clear mode. Encryptor 172, detecting this unique pattern, may similarly respond with a different unique pattern, such as 000111000111, to indicate its having received a request from CPE 101 to switch to clear mode. CPE 101 may then respond to the signal returned by encryptor 172 with a third unique pattern, e.g., 0101010101010 . . ., completing the secure-to-clear handshake (step 417). While this handshaking is illustrative of a protocol that may be used, other methods will be apparent to those skilled in the art. The call then continues until a termination or disconnect signal is detected (step 419). Alternatively, or in addition, the call may continue until secure communications is again required.

The present invention can also be used to make secure-to-secure calls between a calling party and a called party, when each party uses a different type of encryptor/decryptor, i.e., in circumstances in which CPE 101 and CPE 102 do not use the same encryption algorithms. In this embodiment, security node 150 provides encryption conversion between non-compatible encryption/decryption devices, by using two encryptors available in encryptor bank 170.

Figure 5:
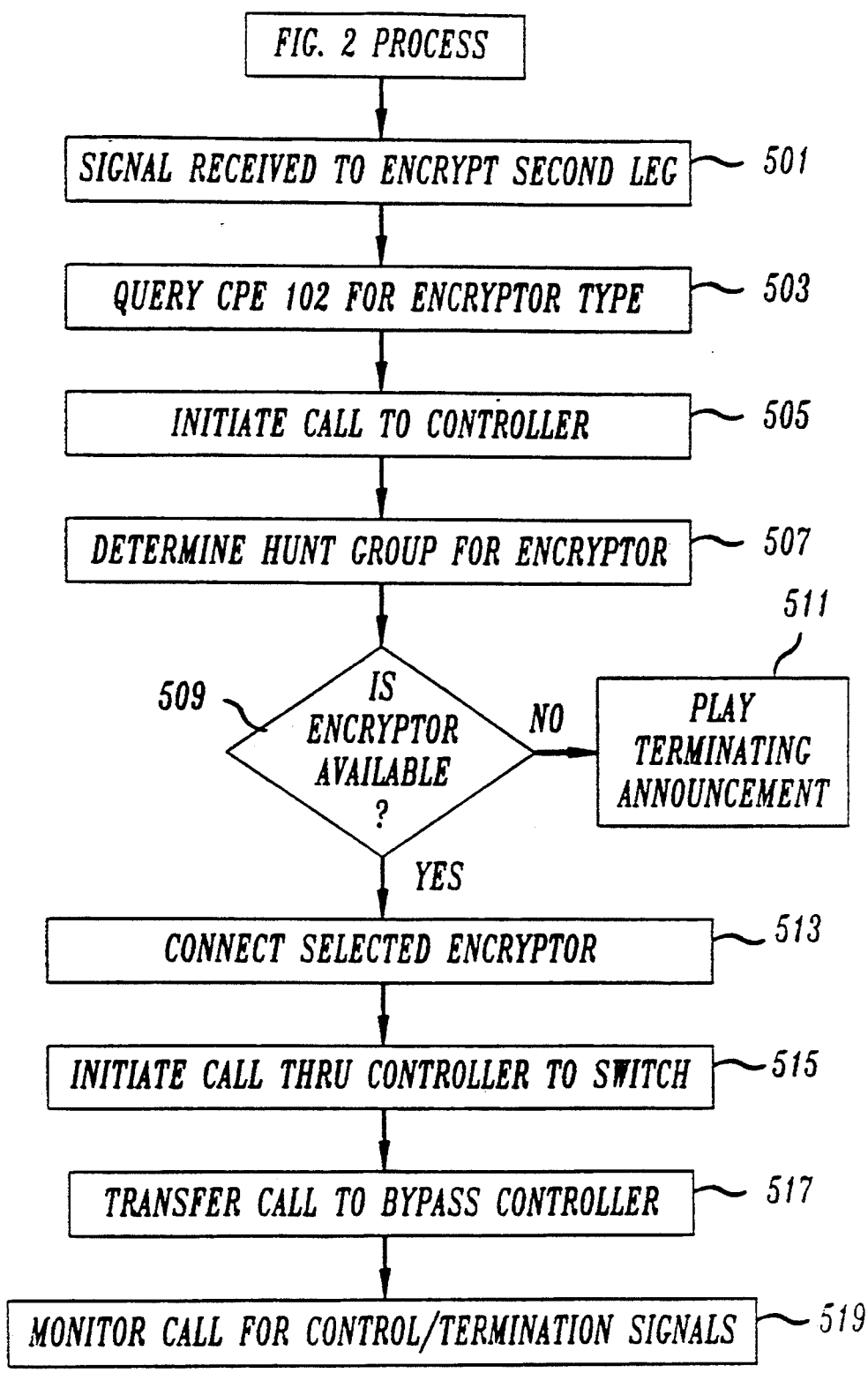
FIG. 5 is a flow diagram illustrating the steps followed in controller 152 in order to set up "secure-to-secure" communication.
Figure 6:
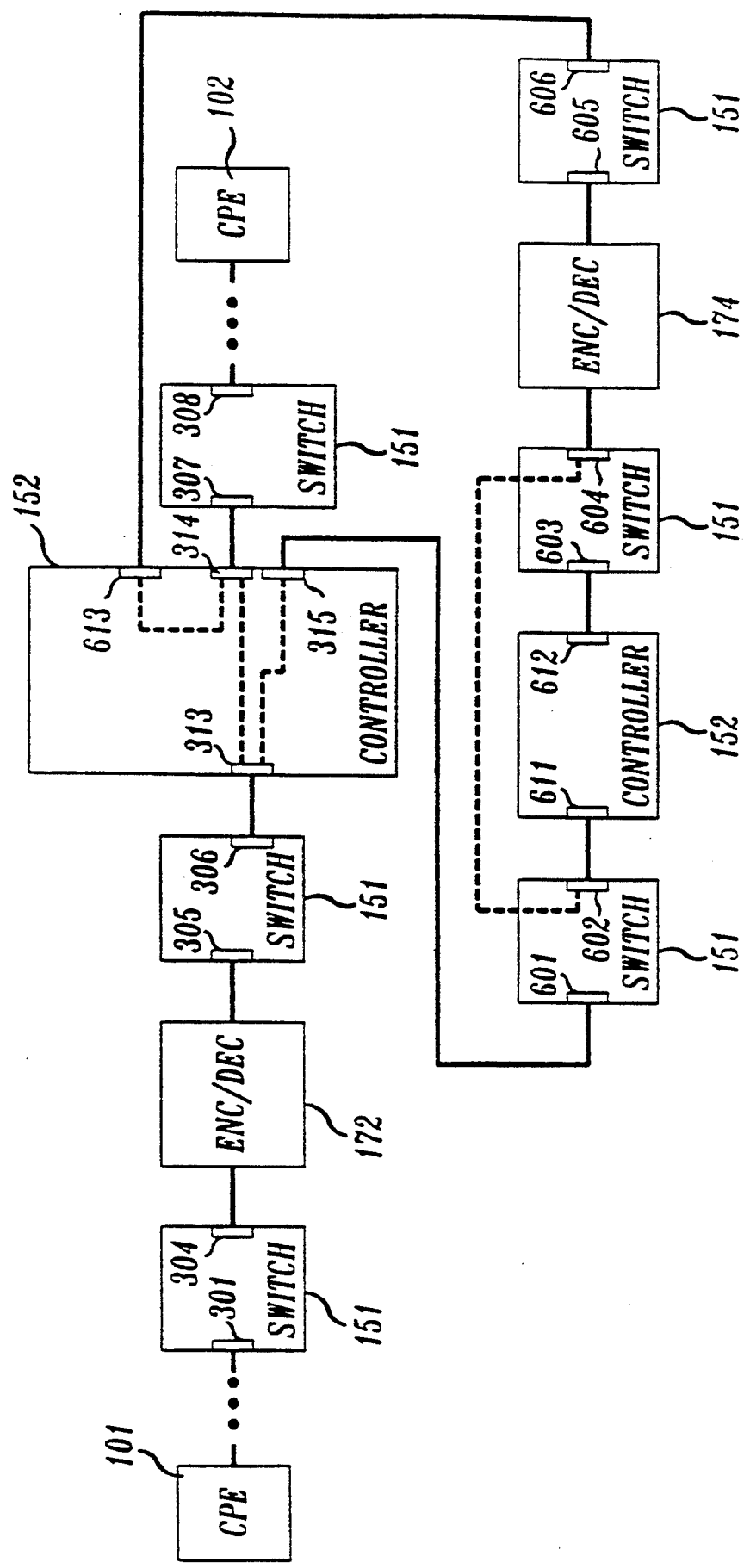
FIG. 6 is a diagram similar to FIG. 3 showing the additional elements involved in the setup process for initiating secure-to-secure communication.

The process used to originate a secure call, with encryption conversion at node 150, is illustrated in flow diagram form in FIG. 5. The initial steps in this process are the same as those described above in conjunction with secure-to-clear calls; accordingly, the process of FIG. 2 is performed first, to establish a secure path between CPE 101 and node 150 and a clear path from node 150 to CPE 102. FIG. 6 illustrates the hardware elements involved in this type of call, and should be consulted in reading the following description.

When communications in the second leg of the call path, (i.e., from node 150 to CPE 102 at the called party location) are also to be encrypted rather than clear, controller 152 is signaled, usually by the called party (step 501). (However, in some arrangements, the decision to encrypt both call legs may be signaled by either the calling party using CPE 101 or by the called party using CPE 102.) Upon detection of a control signal indicating that a second encryptor is needed in the call path, controller 152 queries CPE 102 (step 503) to determine the type of encryptor being used. This interrogation provides controller 152 with information needed to select an appropriate (second) encryptor from encryptor bank 170.

Controller 152 signals switch 151 from a second output port (port 315 in FIG. 6), to establish a second call that is routed through controller 152 (step 505). This arrangement is used because many PBX switches are not presently capable of "transferring" or "bridging" outgoing calls, and can only transfer or bridge incoming calls. This arrangement is also used so that controller 152 remains in the portion of the call path in which the communications are clear. This will be appreciated more fully below. Note in FIG. 6 that the second call to controller 152 originates from port 315 and extends to input port 601 of switch 151, which connects the call via its output port 602 to controller 152 at a different input port 611.

Information identifying the hunt group associated with the particular encryptor type being used by the called party in CPE 102 is determined (step 507) by controller 152, using a look-up in database 154. Controller 152 then initiates a call to a number associated with the hunt group which is output from port 612 of controller 152 and applied to input port 603 of switch 151, causing the switch to connect (step 513) the call to the next available encryptor in encryptor bank 170 of the appropriate type (e.g., encryptor 174 in FIG. 6), providing that it is determined (step 509) that an appropriate encryptor is available. If not, a termination message is played in step 511.

Encryptor 174, like encryptor 172, is arranged so that its output end is connected to a line side termination (port 605) in switch 151. In this instance, however, encryptor 174 is also arranged such that a signal necessary to effectuate a connection in switch 151 between output port 606 to a different input port (port 613) of controller 152 is always produced when encryptor 174 is actuated. This may be accomplished by arranging some encryptors in encryptor bank 170 to be connected to "virtual hot line" connections in switch 151 that automatically connect to available ports in controller 152 when that encryptor is activated by receiving a call at its input port. A virtual hot line may be implemented by programming switch 151 to detect the off-hook condition of one or more of its line side terminations and, upon detecting the off-hook condition, automatically routing the call to a preprogrammed destination without any further signaling from controller 152 or the CPE.

Figure 7:
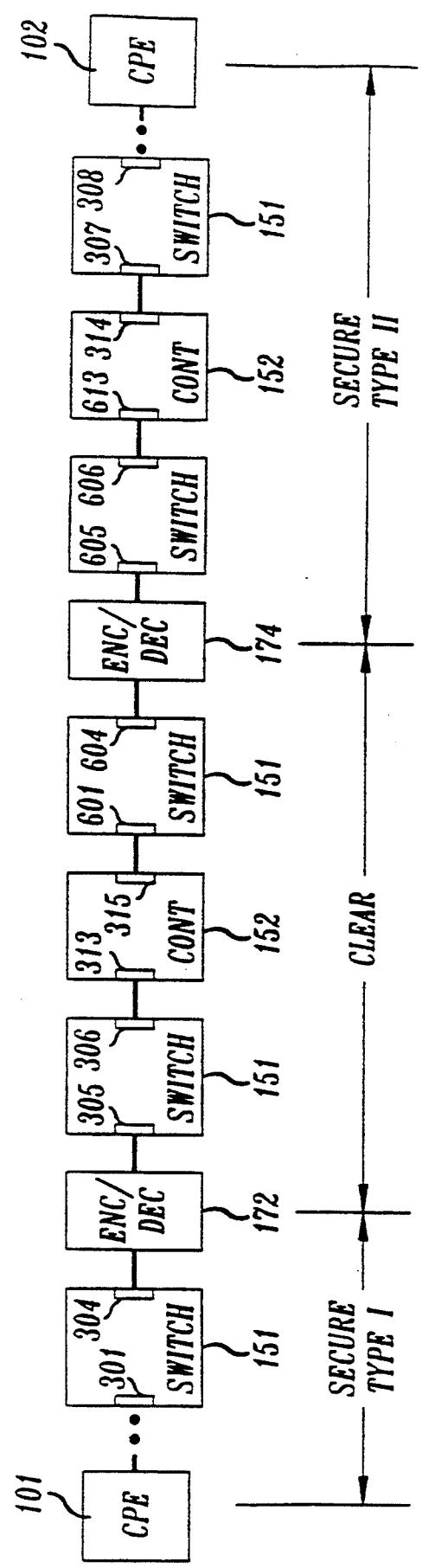
FIG. 7 illustrates the path after secure-m-secure communication has been established using the arrangement of FIG. 6.

When the "hot-line" call is received by controller 152 at port 613, controller 152 is arranged to transfer (step 517) the connection between its input port 313, from output port 314 to output port 315. Concurrently, ports 613 and 314 are connected within controller 152, and ports 602 and 604 are connected within switch 151. In this status, the call path is a shown in FIG. 7. Note the following:

(a) Two encryptors, 172 and 174 are now in the call path, the first being of the appropriate type to convert encrypted messages received from CPE 101 from secure format to clear format, and the second being of the appropriate type to convert encrypted messages received from CPE 102 from secure format to clear format.

(b) Controller 152 remains in the clear portion of the call path between encryptors 172 and 174. Accordingly, controller 152 can be signaled by parties at either end of the circuit, if desired.

The process of FIG. 5 is completed by monitoring the call (step 519) for control or termination signals. As with the embodiment described earlier, call termination is effected conventionally, when either CPE 101 or CPE 102 hangs up. In such event, a disconnect signal is detected by switch 151 or controller 152, and the connections are dropped.

Figure 8:
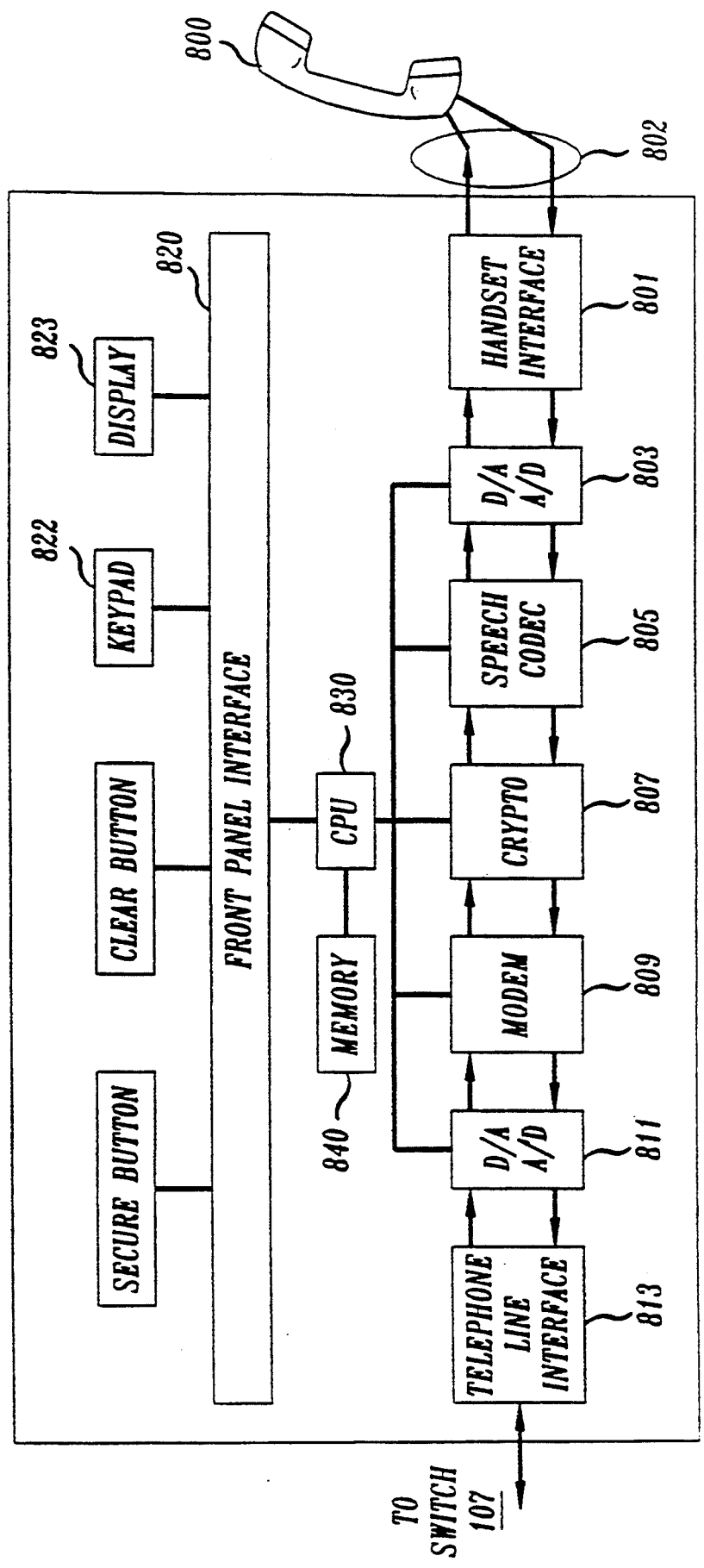
FIG. 8 is a block diagram illustrating the elements of typical customer premise equipment, such as CPE 101 of FIG. 1.

Referring now to FIG. 8, there is shown a block diagram illustrating the elements contained within typical customer premises equipment, such as CPE 101 of FIG. 1. Assuming that CPE 101 is a secure voice terminal, a handset 800 containing a conventional audio input (microphone) and audio output (speaker) is connected to a handset interface 801, which receives and transmits analog ($\sim$200 to 3000 Hz) signals on lines 802. With respect to outbound signals (generated in CPE 101 and destined for a called party via switch 107), the output of interface 801 is connected to an analog to digital converter 803, which digitizes the audio band signal, illustratively to a 56 Kb/s sampled and quantized pulse code modulated (PCM) digital signal. This is done because digital processing in CPE 101 is preferred.

The output of converter 803 is applied to a speech coder/decoder (codec) 805, which compresses the received bit stream to a digital word stream, typically at 2400 or 4800 bps. One type of compression can be provided by a code excited linear prediction (CELP) encoder/decoder of the type found in the STU III secure voice terminal available from AT&T; other codecs are also available. Such other codecs include the speech coding systems disclosed in U.S. patent applications Ser. Nos. 07/782,686 and 07/990,309, commonly assigned herewith, directed to generalized analysis-by-synthesis coding, which are hereby incorporated by reference as if set forth herein. This compression coding is done to facilitate encryption/decryption, which is accomplished in cryptographic module 807. This module may be arranged to perform any well known translation between clear and secure data, using a stored encryption key. The essence of encryption is to allow only authorized users that have access to a encryption key to then be capable of decrypting the secure data to recover the original information. One example of a cryptographic module is described in Federal Information Processing Standard (FIPS) 140-1, "Security Requirements for Cryptographic Modules", draft dated 7/90.

The output of cryptographic module 807 is applied to a modem 809 and then to a D/A and A/D converter 811, which together are interposed in the signal path in order to convert the 2400 bps digital signal output from cryptographic module 807 a sequence of analog modem tones that is suitable for transmission on an analog telephone line. Modem 809 itself performs the conversion of the modem output at 2400 bps to a digital bit stream, illustratively at 56 Kb/s, that is suitable for application to a digital telephone line. This bit steam represents audio tones. Because the signal has been encrypted (scrambled), the tones are scrambled such that an unauthorized listener would not be able to determine the intelligence contained in the original voice message.

Because CPE 101 is typically connected to the telecommunications network through a traditional analog subscriber access loop to LEC switch 107, the output of modem 809 is converted back from digital (56 Kb/s) to analog form in D/A and A/D converter 811, before being applied to the loop via telephone line interface 813. In cases where digital access is provided, D/A and A/D converter 811 and/or interface 813 may not be necessary.

With respect to inbound signals (generated in security node 150 and destined for CPE 101 via switch 107), similar conversion is accomplished. Specifically, analog inputs, representing scrambled audio tones, are received via interface 813 and converted to digital form in D/A and A/D converter 811. The PCM bitstream, representing a series of analog tones is converted to a bit stream at (illustratively) 2400 bps in modem 809, decrypted in cryptographic module 807, and the symbols reconvened to a digital bit stream in codec 805, representing the original analog speech. Finally, the digital bit stream is converted to intelligible analog form in converter 803 before being applied to handset 800 via interface 801.

The CPE arrangement illustrated in FIG. 8 also includes a front panel interface circuit 820, which receives inputs from clear and secure buttons 821 and 824, a keypad or other input device 822, and is arranged to activate a visual display 823 such as may be provided by a LED, LCD or similar display device. Inputs received in interface 820 may be locally processed in a microprocessor 830, operating under the control of programs stored in memory 840. Microprocessor 830 also interacts with, and n-my be programmed to control and coordinate, the operation of D/A and A/D converters 803 and 811, codec 805, modem 809, and, in most instances, cryptographic module 807. This latter interaction may involve secure key storage/retrieval and other encryption related functions.

Figure 9:
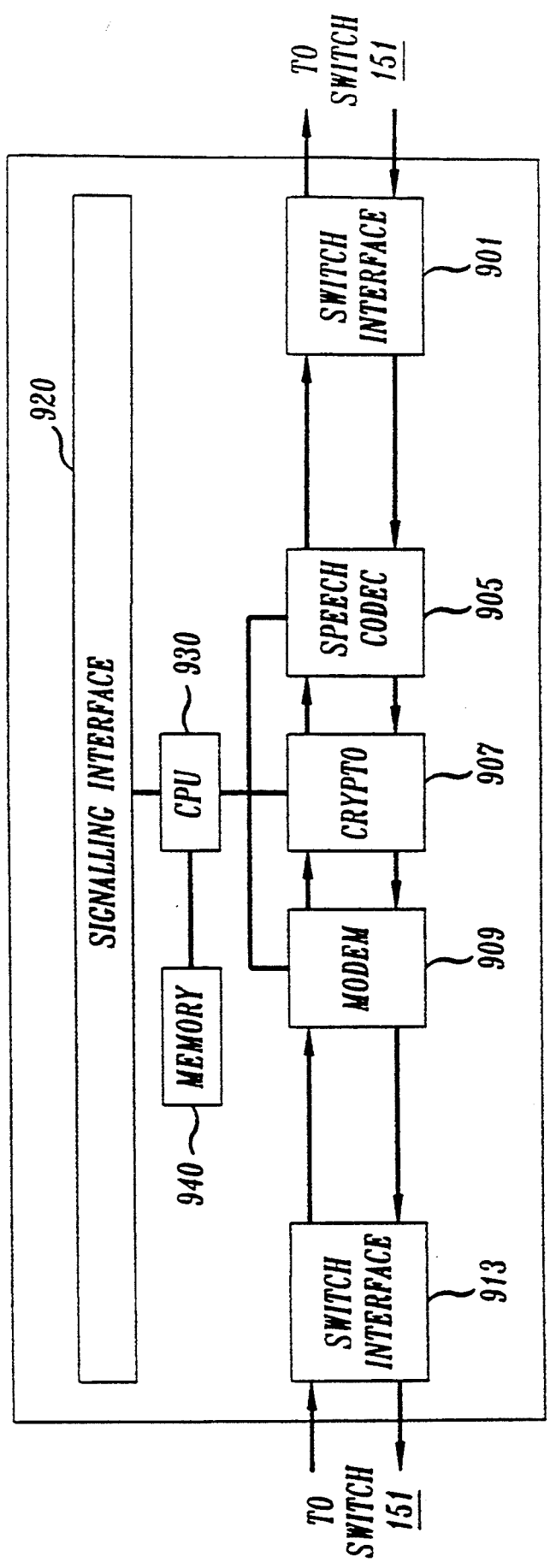
FIG. 9 is a block diagram illustrating the elements of a typical encryptor, such as encryptors 172 and 174 within encryptor bank 170.

FIG. 9 is a block diagram illustrating the elements contained within a typical encryptor such as encryptor 172 or 174 within encryptor bank 170. Many of the elements, such as codec 805, cryptographic module 807 and modem 809, are the same as those described in connection with FIG. 8. However, it will be noted that each encryptor typically receives inputs from, and supplies outputs to, a PBX or switch, particularly a digital switch 15 1 of FIG. 1. For this reason, analog to digital conversion (and vice versa) may not be needed, and D/A and A/D converters 803 and 811 are not present. Further, the functions performed by handset interface 801 and telephone line interface 813 are performed by a pair of PBX interface circuits 901,913.

The encryptor of FIG. 9 also includes a signaling interface 920 in place of front panel interface 820 of FIG. 8. This is because the encryptor is advantageously positioned within the telecommunications network, and is signaled by calling and called parties using the capabilities of controller 152.

The call origination sequence described above was illustrative, and persons skilled in the art will appreciate various alternative processes that may be available where additional intelligence is built into other components of the telecommunications network. An example will illustrate. Assume that database 120 in FIG. 1 is able to retrieve additional information about selected calling and called party numbers, and that switches 110 and/or 125 are capable of performing interactive scripts in response to such information received via signaling network 115. In this embodiment, a caller dials the security node 150 access number, and the call is recognized by database 120 as requiring special treatment. The caller is prompted by switch 110 (for example) to identify the call type, i.e., if the call is secure-to-clear, clear-to-secure, or secure-to-secure. For a secure-to clear call, the caller is prompted to input a User I.D. number using the touch tone pad on CPE 101. Switch 110, in conjunction with database 120, attempts to validate the User I.D. number. If the User I.D. cannot be verified, the caller is informed of the status and asked to re-enter a valid User I.D. #. If the User I.D. number cannot be validated after two attempts, the caller is notified that there is a problem, asked to call a support center with a different telephone number for additional support, and the call is dropped. Thus, portions of steps 203, 205 and 207 of FIG. 2 may be performed outside of node 150.

Figure 10:
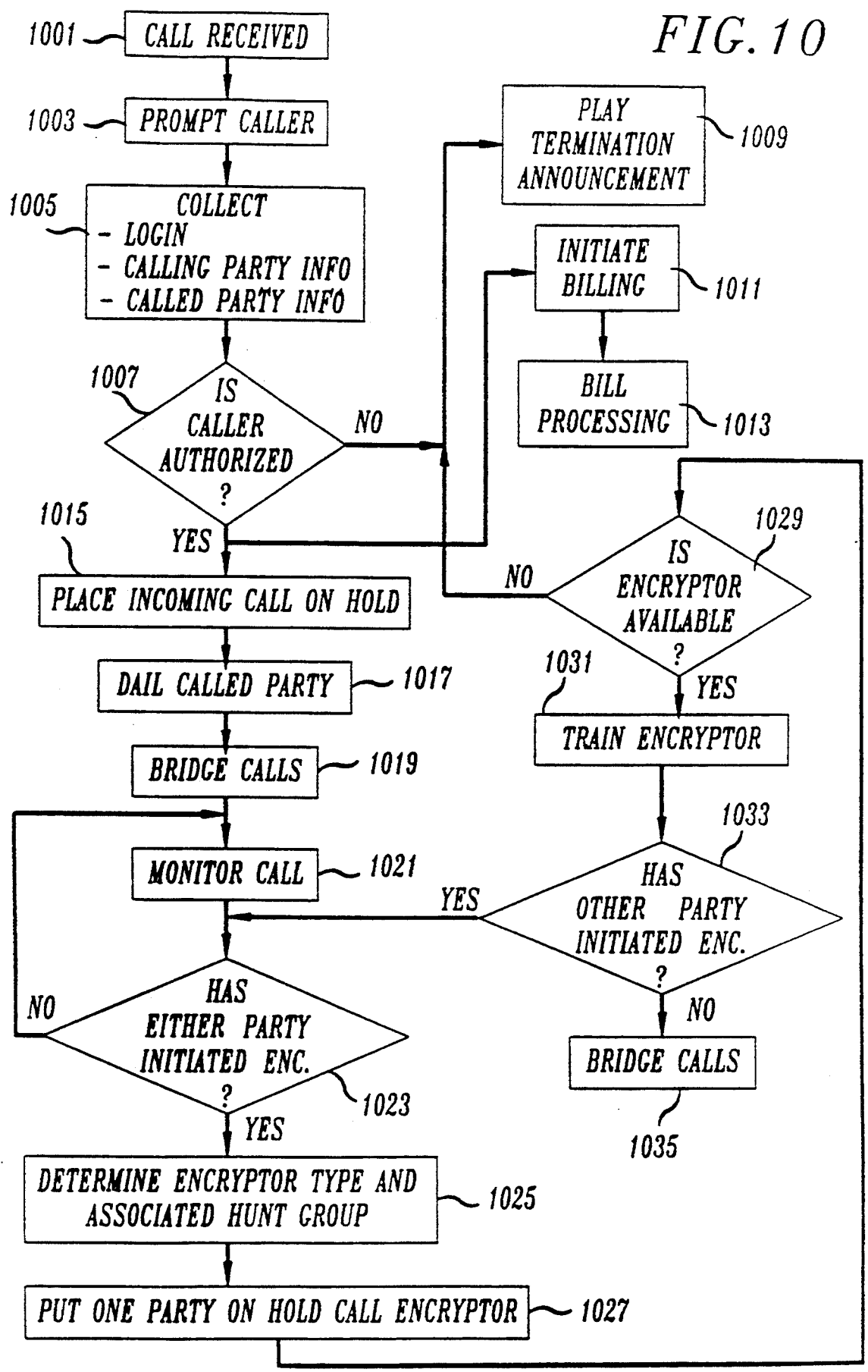
FIG. 10 is a flow diagram illustrating an alternative process for completing secure-to-clear, clear-to-secure, and secure-to-secure calls using security node 150.

An alternative process by which the system of FIG. 1 can be used to set up a secure-to-clear call is illustrated in the flow diagram of FIG. 10 and the hardware diagrams of FIGS. 11–15. (A similar process would be followed for clear-to secure and secure-to-secure calls.) This process differs from that described above in several important aspects. First, an end to end connection is established between calling and called parties before any encryptors are inserted in the call path. Second, controller 152 is removed from the call path after encryption begins. Third, encryptor "type" information is provided automatically to node 150, at the time when either party desires to begin secure communication.

The process begins upon receipt of a call (step 1001), whereupon switch controller 152 prompts the caller (step 1003) for login, password and called party number information needed to complete the call. Encryptor "type" information is not provided at this point. The information is collected (step 1005) and stored in database 154. If the caller is an authorized user (step 1007), controller 152 then places the incoming call (from CPE 101) on hold (step 1015) and transmits called party information previously stored in database 154 to switch 151 in order to initiate a call to CPE 102 in step 217. As with the process of FIG. 2, routing of this call is from controller 152 to switch 151 via line 168, from switch 151 to switch 125 via trunk 163, and then through telecommunications network 156 to CPE 102. If the caller is authorized, billing and bill processing are initiated (steps 1011 and 1013); if the caller is not authorized, a termination announcement is played (step 1009).

When the called party answers, controller 152 signals switch 151 to bridge (step 1019) the call TO controller 152 with the call FROM controller 152. This establishes a clear communication path between both parties and leaves one "appearance" of controller 152 temporarily in the path, so that it can continue to "monitor" the call (step 1021) for the occurrence of control signals indicating that either party desires to transfer the call from the clear mode to the encrypted mode.

If it is determined in step 1023 that either party has transmitted a "begin secure transmission" signal to controller 152 indicating a desire to encrypt information transmitted over the portion of the transmission path between that party's CPE and node 150, a determination is made (step 1025) of the type of encryptor being used in that CPE. Such determination is made "automatically" by controller 152, which recognizes a code indicative of the encryption type that is sent together with the "begin secure transmission" signal. Until a "begin secure transmission" signal is detected, step 1021 is repeated.

The training message may include DTMF tones or other signaling information that specifies the type of encrypting device being used by the calling party. Alternatively, an Adjunct Switch Application Interface (ASAI) in switch 151 can recognize DTMF tones generated in CPE 101 during call set-up. In this event, both the encryption type as well as the hunt group number(s) associated with that type of encryptor, can be determined automatically and sent to controller 152.

Step 1025 also involves determination of the "hunt group" for the appropriate encryptors. Specifically, when controller 152 has determined the type of encryption being used in the CPE that initiated the "begin secure transmission" signal, a lookup operation is performed in database 154 to determine the hunt group designation associated with the appropriate encryptors within encryptor bank 170. Controller 152 (step 1027) then signals switch 151 to place one party (i.e., the party that did not generate the "begin encryption signal") on hold, and to initiate a call to the hunt group associated with the selected encryptor type. When that hunt group is called, the next available encryptor of the appropriate type (e.g., encryptor 172 in FIG. 1) is selected by switch 151. However, if no encryptor of the selected type is available (step 1029), the process is terminated (step 1009).

When the training of encryptor 172 (step 1031), which follows the same process as described above in conjunction with FIG. 5, is complete, a determination is made in step 1033 as to whether, during the training interval, the other party (i.e., the party not involved in the step 1023 request for encryption) has signalled a request to initiate encryption of messages sent over the remainder of the communication path. If not, the call placed on hold in step 1027 and the call from controller 152 to encryptor 172, are bridged in step 1035. At this point, controller 152 may be dropped from the communication path by sending an appropriate control signal to switch 151, which establishes a bridging connection internal to the switch. Note however, that because encryptor training was accomplished with controller 152 in the communication path, it is important that removal of controller 152 from the path not disturb the ability of CPE 101 and 102 and encryptors 172 and 174 to continue encrypted communication. This can be arranged by assuring that controller 152 introduces only negligible delay and frequency distortion in the communication path.

If the other party has signalled a request to initiate encryption, steps 1025-1031 are repeated with respect to that party's encryptor type. In this manner, a secure-to-secure call is completed.

Figure 11:
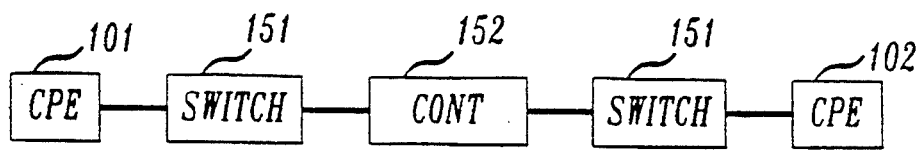
FIGS. 11-15 illustrate the hardware arrangements during various steps in the process of FIG. 10.

The hardware diagrams in FIGS. 11-15 illustrate the process depicted in FIG. 10. FIG. 11 illustrates the arrangement of CPE 101 and 102, switch 151 and controller 152, after step 1019 is completed. Note that controller 152 is inserted in the clear communication path that exists between calling and called parties.

Figure 12:
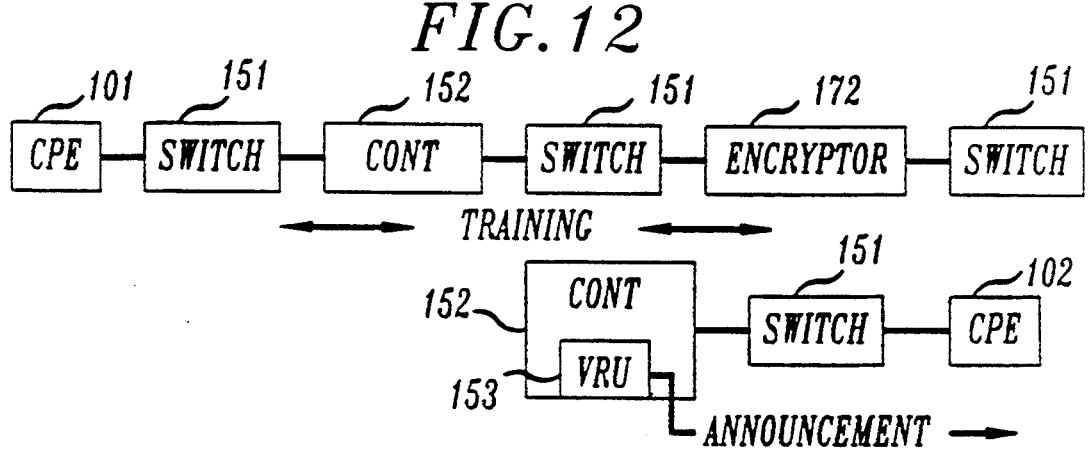

In FIG. 12, the arrangement of the same hardware components is illustrated after step 1031 is completed. At this point in the process, encryptor 172 is training with the encryption module in CPE 101, and, concurrently, the called party at CPE 102 is on hold, typically receiving an announcement from VRU 153 in controller 152 indicating that training is ongoing with the other party.

Figure 13:
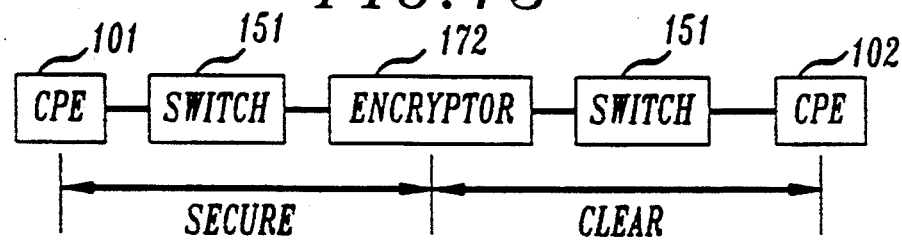

In FIG. 13, the process of FIG. 10 has been completed with respect to a secure-to-clear call. Note that the hardware arrangement is similar to that shown in FIG. 3, with the exception of the fact that controller 152 is not in the communication path.

Figure 14:
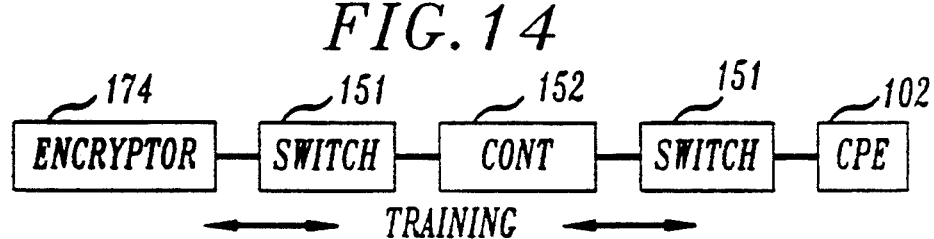
Figure 15:
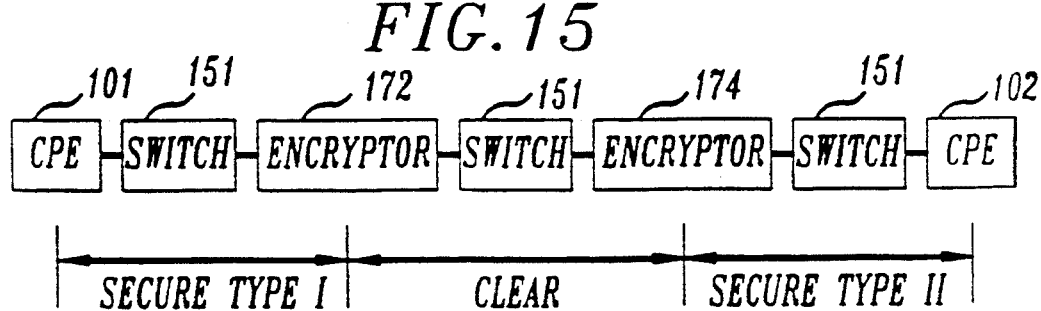

FIG. 14 illustrates the additional elements involved in a secure-to-secure call, when the other party initiates encryption in step 1033. As shown, the encryption module in called party CPE 102 is training with a second encryptor, encryptor 174. When the training process is complete, the hardware arrangement is as illustrated in FIG. 15. Note that this arrangement is similar to that shown in FIG. 7, with the exception of the fact that controller 152 is not in the communication path.

Various modifications may be made to the arrangement illustrated in the figures, without departing from the spirit and scope of the present invention. Several examples will illustrate:

To protect against fraud and other abuses, security node 150 may be arranged to track the number of call attempts per calling party (as determined by monitoring ANI) to access that node. After a predetermined number of attempts within a predetermined time interval, the security node automatically blocks any further attempts from that calling party (ANI) to gain access into the node. Secure addressing may also be provided. This permits securing the call from the calling STD or CPE to the security node prior to inputting the called number, so that an eavesdropper cannot ascertain the called number and/or dialing patterns of the calling party.

The Secure Telephone Device

While FIG. 8 contemplates CPE in which encryption/decryption elements and related signal conversion is performed internal to a telephone station, in some arrangements, as stated previously, it may be preferable to attach an external device, known as a "secure telephone device" (STD) to an otherwise ordinary terminal, in order to give the terminal the same functionality as described above. In this arrangement, the STD is attached to the users telephone between the handset and the telephone base. As would be readily apparent to one of ordinary skill in the art, the STD connects to the handset and base by means of standard 4-wire modular telephone jacks and conventional handset cords and employs a telephone base interface (813) in place of the line interface 813 shown in FIG. 8. A separate AC transformer supplies power to the STD.

Preferably, the STD is compatible with many types of electronic, modular, touch tone business and residential phones. If desired, a user may configure the STD through a display device and software defined switches on the STD. Such a display device provides the user with identification of secure or clear mode and a visual signal to assure the user that an unauthorized person has not altered their communications. The STD can be small and light enough to be portable (e.g., an illustrative STD housing may be made of plastic ($7'' \times 4\frac{1}{4}'' \times 1\frac{1}{4}''$)), such that it can be conveniently carried between locations (i.e., office, home, travel).

When a calling and called party use STDs employing the same encryption/decryption algorithms, a secure call may be established between such parties without operation of security node 150. Such secure calls may be established as follows (see FIGS. 1 and 8). A calling party employing a conventional telephone with an STD 191 initiates an ordinary (non-secure) call to a called party also having an STD 192. This is done in conventional fashion by dialing the called party's telephone number and allowing the switched telecommunications network 156 to complete the call. When the called party answers his telephone, the ordinary non-secure call is established. At this point, the calling and called party may converse in ordinary non-secure fashion. Each party's STD 191,192 acts as a simple conduit, receiving non-secure signals from a party's handset or base and passing such signals on to the base or handset, respectively (each STD 191,192 may perform A/D and D/A conversion, but no encryption/speech coding or decryption/speech decoding is performed).

When the parties to the call decide they wish to employ secure communications, either party may initiate a switch to secure mode. To establish secure communications, either party, e.g., the calling party, depresses the "secure button" 824 on his STD 191. This initiates training and key exchange sequences as described above with reference to steps 401–407 of FIG. 4 (concerning the encryption unit within CPE 101 and encryptor 172 of node 150; in this case encryptor 172 is replaced by the encryption unit 807 of the called party's STD 192; see FIG. 8). Both STDs involved in these sequences employ the same encryption algorithm, such as FIPS 140-1. As a result of these sequences, the parties can converse in a secure fashion. When they desire to converse in non-secure mode, either party may depress the "clear button" 825 on his STD (191 or 192) and the signalling sequence described above with reference to steps 411–417 of FIG. 4 is used to effect non-secure (or clear) mode.

Services

The present invention may be used in conjunction with various services that are already available, as well as many new services that are to be offered in the future. One such service is termed the "totally secure phone call." This service is similar to those discussed above with reference to node 150 except that sensitive information is communicated while in secure mode, not in clear mode. For example, such sensitive information might include the telephone number of the called party. This service may be understood with reference to FIG. 16.

According to this service, a user whose telephone includes an STD 191 dials a special telephone number with the keypad on, e.g., the user's telephone base. The special number connects the user's (caller's) telephone 193 with security node 150 in the manner discussed above (step 1605). Controller 152 prompts the caller for a minimum amount of information needed to go into secure mode (step 1610). For example, controller 152 may prompt the caller for "login" information as discussed above. Once in receipt of this "login" information (step 1615), controller 152 determines whether the caller is an authorized user (step 1620). If so, the caller's STD encryption algorithm is determined such that a secure link may be established between the caller and the node 150 (step 1630). Such a determination may be made by access to database 154 using the received login as an index. If the caller is not authorized, the call is terminated (step 1625).

Once the encryption algorithm is known, a secure link between node 150 and the calling party is established according to the procedures discussed above with reference to FIG. 2 (steps 211–221) and FIG. 4 (steps 401–407) (step 1635). In this case, secure mode may be instigated by controller 152 which sends a training message to the calling party's STD. A key exchange between the cryptographic system of the STD and an encryptor, e.g., encryptor 172, of node 150 follows as described above.

After a secure call is established between the calling party and the node 50, controller 152 may prompt the calling party to supply the sensitive information (step 1640). These prompts are encrypted by encryptor 172 and communicated to the calling party as discussed above. Here, however, the calling party's STD 191 decrypts the prompt. Caller responses to prompts are similarly encrypted by the caller's STD and are provided to encryptor 172 for conversion into clear text for subsequent use by controller 152 (1645).

Caller responses to requests may be entered through use of the keypad 822 on the STD 191 as shown in FIG. 8. This keypad may appear like an ordinary DTMF generator pad, but it need not necessarily generate DTMF tones. All that is required is that it generate a digital code identifying a given button when depressed. Should digital codes be generated rather than DTMF tones, a special flag should be communicated identifying the information as a code (rather than a tone). In this way, node 150 will be able to interpret the communicated information as a code rather than as an audible tone or speech. Digital codes generated in this fashion are provided via interface 820 and CPU 830 to crypto system 807. Crypro system 807 encrypts these digital codes to provide the desired security for response data. When CPU 930 of receiving encryptor 172 (FIG. 9) detects the special flag indicating that an STD button has been depressed, CPU 930 directs crypto system 907 to output a digital signal representing an appropriate DTMF tone to speech codec 905. The output of speech codec 905 is therefore a DTMF tone representative of the button pushed on the STD. Thus, sensitive response information, such as a user's password or the number of the called party, may be maintained in secure fashion.

Once the node 150 receives all needed information in secure mode from the calling party, the controller 152 of node 150 can establish a secure call to a called party (the decision to encrypt the call to the called party is implicit). To do this, controller 152 first determines the encryption algorithm of the called party (step 1650). The encryption algorithm of the called party is known (due to use of a common STD) or determined by access to database 154 (as above, database 154 includes information on the encryption algorithms of called parties; other embodiments can employ a non-secure query to the called party for encryptor type). Given the decrypted called party's telephone number, controller 152 generates the necessary control signals to dial the called party (who also has an STD) (step 1655). Once the called party answers the telephone, VRU 153 of controller 152 informs the called party that a secure call is being made. Secure communication with the called party is enabled in the manner discussed above with reference to FIG. 5 (step 1660). At this point, the two calls may be bridged as discussed above. As a result, sensitive information may be used to establish a call without concern that such information will be compromised. Unlike as described above, the first and second links to this call (caller to node; node to called party) employ the same encryption algorithm.

In light of this discussion, it will be apparent that the "totally secure phone call" service may be provided using the techniques and equipment (including STDs) discussed generally above with reference to FIGS. 1–7. A salient difference is that rather than all node prompts and party responses occurring in clear (i.e., nonsecure) mode, one or more of such prompts and responses occur after a secure link has been established.

Related to the "totally secure phone call" service is a method for communicating "secure personal information." Often there is a need to provide sensitive personal information over the telephone to a receiving device or system, such as an information service system. For example, an automated information service system accessed by a calling party, such as automated banking-by-phone, may require the calling party to provide a personal identification number (PIN), social security number, or the like, as part of, for example, a sign-on procedure. An STD (or other CPE) including a keypad of the type presented in FIG. 8 and discussed above may be used in combination with an automated information service system to provide the desired security. FIG. 17 presents an illustrative schematic representation of such a combination.

As shown in the Figure, the combination comprises calling party telephone/STD equipment 1705–1720 of the type discussed above and an automated information service 1760. The automated information service (AIS) 1760 comprises CPE 1740 and an AIS platform 1750. CPE 1740 is similar to the STD discussed above with reference to FIG. 8. However, CPE 1740 is controlled by application of control signals from the AIS platform. These control signals replace the "secure" and "clear" button user interface discussed above. The control signals are applied via coupling 1745 to panel interface 820 of CPE 1740. AIS platform 1750 represents any of the possible information services accessible by telephone, such as banking-by-phone. The illustrative AIS platform 1750 includes a voice response unit (VRU) 1755 and database 1757 and may be a Conversant ® system available from AT&T. The database 1757 includes, among other things, voice scripts for playing to a user with use of the VRU 1755.

At the outset of AIS 1760 operation, the AIS platform 1750 maintains CPE 1740 in clear mode via a "clear" control signal communicated over coupling 1745. In clear mode, AIS 1760 can receive telephone calls from service users in conventional fashion. CPE 1740 acts as a conduit for incoming calls, passing such calls on to AIS platform 1750 via coupling 1747. When an AIS service user dials the AIS service 1760, the VRU 1755 prompts the user for information in accordance with a stored script in local service database 1757. Such prompted information may comprise a "login" and information reflecting whether the user has an STD 1710. If a user has an STD 1710, the VRU 1755 may prompt the user to initiate secure communications by, e.g., depressing the "secure button" on the user's STD 1710. (Alternatively, the AIS platform 1750 may determine for itself that the user has secure communications capability and signal its own CPE 1740 via coupling 1745 to initiate secure mode). As a result of initiating secure communications, training and key exchange occur as discussed above between STD 1710 and service CPE 1740. At this point, the link between the calling party and the service 1760 is secure. As such, the user may access the information service is conventional fashion. All further voice information provided by the service 1760 is passed through the CPE 1740 for encryption prior to being sent to the calling party. Moreover, all calling party information is encrypted by STD 1710 prior to being communicated to the service 1760. Such information may include, for example, PINs or social security numbers entered via the STD keypad as discussed above. At any point during the secure call, either the user or the information service may command a return to non-secure mode. The user may do this by pressing the "clear button" on his STD. The service may do this by the platform 1760 sending a "clear" control signal to the CPE 1740 via coupling 1745. Either way, a switch to the clear mode may be effected as discussed above.

It should be understood that method for secure personal information may be combined with the "totally secure phone call" service discussed above. According to this combination, coupling 1730 (between the user's telephone base 1720 and the service 1760) comprises node 150 and other aspects of the switched network 156 (as described above with reference to the secure service). With this combination, a user dials the number accessing node 150 in clear mode. A secure connection is established between the user and node as discussed above. Finally, node 150 dials the information service and establishes a secure link between itself and the service platform. In this way, all information related to the user's access to the service is maintained in secure fashion.

The concept of communicating in secure fashion with an information service is further illustrated with reference to voice messaging systems, such as the AUDIX ® system available from AT&T. Specifically, a user of a voice messaging system may wish to leave a secure voice message for a recipient. As a general matter, this may be done by equipping users and the voice messaging system with STD/CPE equipment to allow secure access to stored messages. Secure voice messaging may be understood with reference to FIG. 18.

Figure 18:
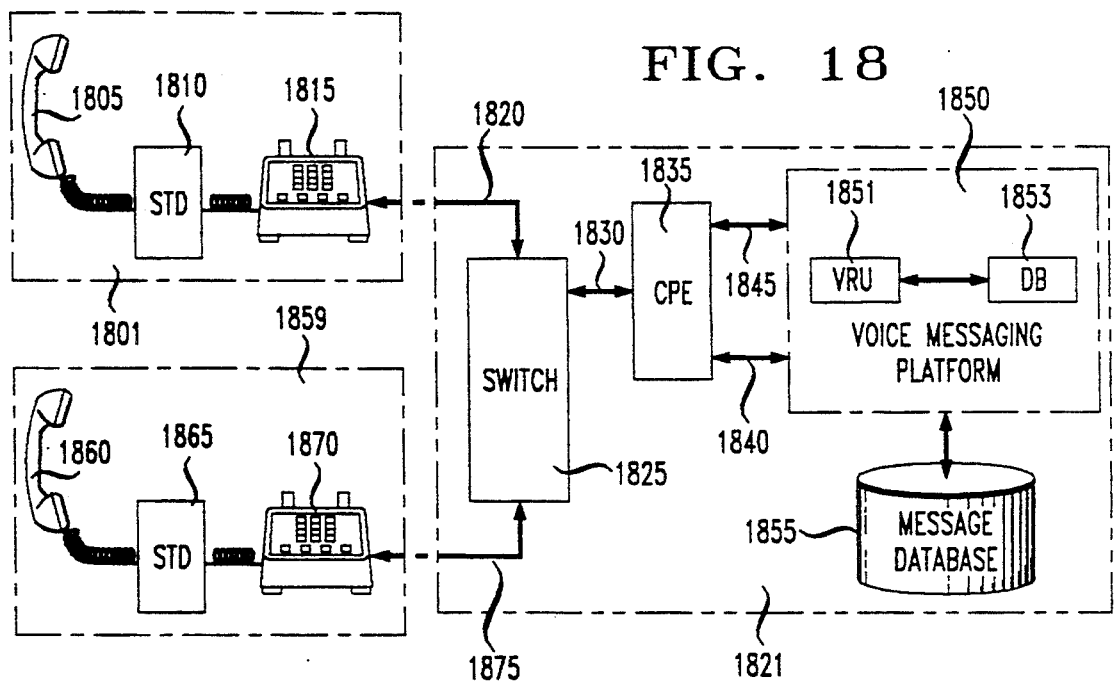
FIG. 18 presents a system providing secure voice messaging.

FIG. 18 presents a secure voice messaging system 1821 coupled to two secure user telephone stations 1801 and 1859. The secure voice messaging system 1821 comprises a switch 1825, CPE 1835, a voice messaging platform 1850 and a database 1855 on which to store received messages and other data. The switch 1825 may be the Definity ® digital PBX available from AT&T. CPE 1835 is as described above with reference to FIG. 17. The voice messaging platform and database 1850 and 1855 may be the AUDIX ® system available from AT&T. The platform comprises a VRU 1851 and script database 1853. In this case, the voice messaging platform 1850 is adapted to provide CPE control signals as discussed above. Each user station 1801, 1859 comprises a handset 1805, 1860, an STD 1810, 1865, and a telephone base 1815 and 1870, respectively.

In operation, a user at station 1801 (the "caller") dials the number of another user at station 1859. If the user at station 1859 fails to answer, the switch 1825 connects the caller with the platform 1850 via CPE 1835. Alternatively, the caller may dial a special extension to access the platform (via CPE 1835) directly. In either event, CPE 1835 is operating in clear mode at this point in time. That is, it is acting as a conduit passing speech and DTMF signals from the caller's station 1801 to the voice messaging platform 1850. The voice messaging platform 1850 prompts the caller for information as is conventional (with use of VRU 1851 and database 1853). The caller responds to such prompts with DTMF tones in conventional fashion. In addition, the platform 1850 may prompt the caller to use secure mode if the caller so desires. In response to a prompt from platform 1850 to use secure mode, the caller may depress the "secure button" on the caller's STD 1810. As a result, training and key exchange sequences are performed by STD 1810 and CPE 1835 as described above. Once in secure mode, the caller may record a message for the recipient for later retrieval. Such a message is encrypted by STD 1810 and decrypted by CPE 1835. Once decrypted by CPE 1835, the message is stored as clear text on database 1855. Any commands required to be given to the voice messaging platform 1850 by the caller are provided with use of the keypad on the STD 1810. As discussed above, these commands may include DTMF tones or suitable identified codes corresponding to keypad buttons. If codes are used, the CPU and crypto system of CPE 1835 recognize and replace these codes with digital signals for DTMF tones as discussed above.

When retrieving voice messages, the message recipient at station 1859 dials the messaging access number and is connected to the messaging system in conventional fashion via switch 1825 and CPE 1835. The recipient responds to voice prompts via the telephone base 1870 keypad is as conventional. The recipient may also go into secure mode in the manner discussed above by depressing the "secure button" on the recipients STD 1865. Once in secure mode, the recipient may retrieve stored messages securely. These messages are retrieved by commands to the messaging system issued with use of the keypad on the STD 1865.

Secure voice and fax storage and retrieval may be provided by the arrangement of FIG. 18 to allow an incoming message (on ring no-answer or busy) to be forwarded to a secure mailbox (i.e., database) where the message will be stored in encrypted format for subsequent access by the called party. This protects the encrypted message in a secure location until it can be retrieved by an authorized party. The calling party can be assured that the information is safe until it gets to the intended recipient.

In storing messages in secure fashion for later retrieval, CPE 1835 does not decrypt received messages. Rather, CPE 1835 passes encrypted messages in digital form to database 1855 via platform 1850. Naturally, CPE 1835 does not perform speech decoding on the received message. Stored along with the encrypted message is the encryption key obtained during the key exchange referenced above. In retrieving an encrypted message from the database 1855, CPE 1835 initiates training and key exchange sequences with STD 1810. The key used will be the key stored with the message. Initiation of such sequences is made under the control of platform 1850. Platform 1850 initiates secure communications by command to CPE 1835 via coupling 1845. Once secure communications is established, encrypted message data stored in database 1855 is communicated to the user at station 1859 via CPE 1835, switch 1830 and channel 1875. Processing by STD 1865 to decrypt and decode the received message is as discussed above.

Removable Interface Module for the STD

As discussed above, an STD may be configured to be compatible with many types of telephones through use of software defined switches on the STD. However, STD telephone compatibility, as well as STD portability, may also be facilitated by use of removable/replaceable telephone handset and base interfaces. An illustrative STD adapted to include such interfaces comprises a set of core components (which need not be changed) and handset and base interfaces associated together in a removable interface module. This removable module may be changed to suit the STD operation environment (i.e., the telephone with which the STD must function). The removable module may be realized, for example, as a cartridge containing interface circuitry which slides into an opening or channel in the STD housing and connects to electrical contacts within the STD. An STD configuration with a removable interface module is illustratively presented in FIGS. 19, 20 and 21.

Figure 19:
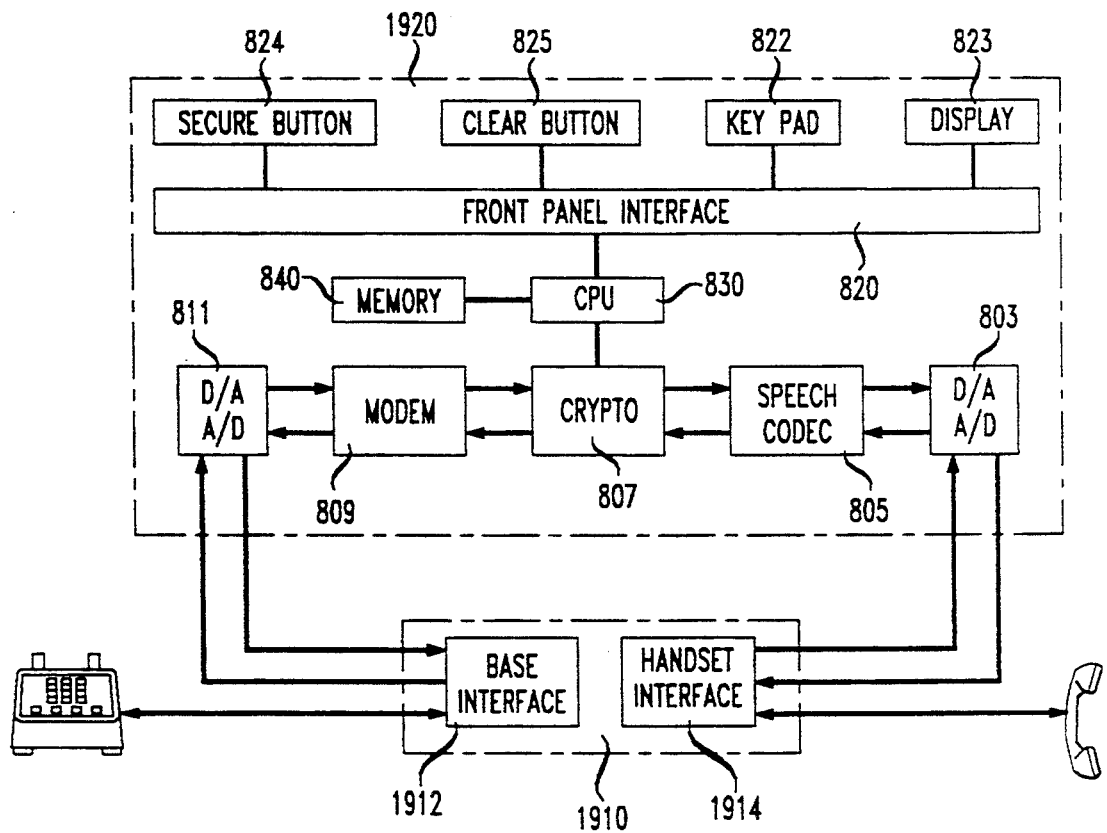
FIG. 19 presents a secure telephone device adapted to receive a plug-in telephone handset and base interface module.

As shown in FIG. 19, the illustrative STD is similar to that presented in FIG. 8 except that the base and handset interfaces are associated together in a removable module (or cartridge) 1910. The coupling of module 1910 to STD core components (collectively identified as 1920) is made by a conventional plug-type connector well known in the art (any connector suitable for plug-in module-type coupling may be used). Core components shown in FIG. 19 which are identical to components illustrated in FIG. 8 have been numbered in the same fashion. Base and handset interfaces 1912 and 1914, respectively, perform the same functions as their counterparts in FIG. 8 (813 and 801), but are physically coupled together in module 1910.

The configuration of FIG. 19 facilitates STD compatibility and portability because the module 1910 functions to adapt the STD to the electrical requirements of the telephone set to which it is connected. Should a user wish to use his or her STD with telephone sets having differing electrical interface requirements (such differing requirements due to, e.g., a difference in handset microphone types), all that is required is the replacement of module 1910 with an appropriate module adapted to interface with the given telephone set. As is well understood in the art, many telephones have substantially similar interface requirements. Consequently, a single plug-in module may be sufficient for more than one telephone. Because of the ability to adapt an STD to various telephones, a user may take his or her STD to various locations and use the STD to turn a conventional telephone set at a given location into one having secure voice capability.

Figure 20:
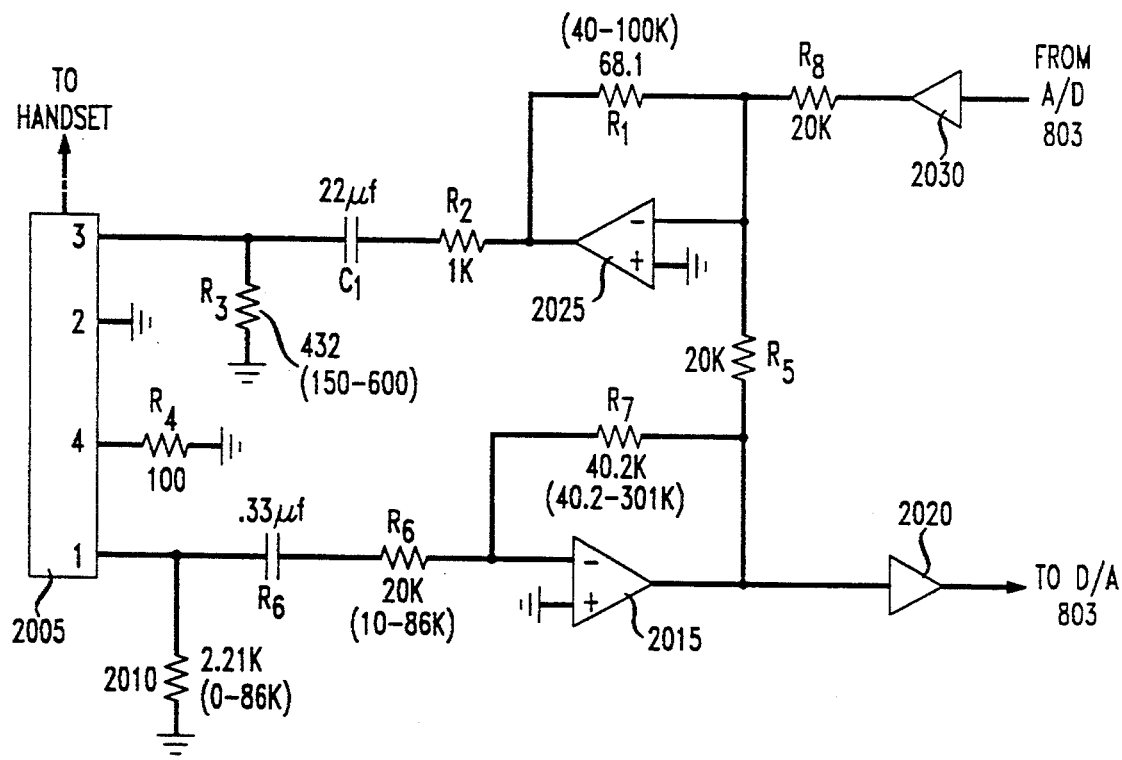
FIGS. 20 and 21 present schematic diagrams of telephone handset and base interface circuits, respectively, for use in the plug-in module presented in FIG. 19.

FIG. 20 presents a further detailed view of the handset interface 1914 of plug-in module 1910. Connector 2005 couples a handset (not shown) to the handset interface of module 1910. As shown, this coupling comprises four coupling pins (1–4). Pin 4 couples the handset to a five volt power supply. Pin 2 couples the handset to ground. Pin 3 couples the handset receiver (loudspeaker) to its driving signal provided by the STD (i.e., provided by core components 1920 through amplifiers 2025 and 2030). Pin 1 couples the handset transmitter (microphone) to the STD (i.e., to amplifiers 2015 and 2020 and core components 1920).

The interface shown facilitates the operation of core components 1920 with many standard AT&T handsets, such as "K" type handsets. Other handset types may be accommodated by varying interface component values and pin assignments. For example, some handsets require handset connecting pin 3 to ground and pin 2 to amplifier 2025; and connecting pin 1 to the power supply and pin 4 to amplifier 2015. Also, some handsets may require different transmitter load impedance. This may be accomplished by varying the value of resister 2010 (illustrative component value variations are presented in parentheses). Resistors $R_2$ and $R_3$ are provided to match handset speaker impedance. Values for these resistors may be changed to suit handset speaker requirements. Finally, the value of the gain of amplifiers 2015 and 2025 may be adjusted to suit transmit/receive voltage requirements between a given handset and the core components 1920 of the TSD. Amplifiers 2020 and 2030 are conventional buffer amplifiers. Resistor R 3 provides a conventional "side tone" signal allowing a speaker to hear himself (or herself) in his (her) handset ear piece.

Figure 21:
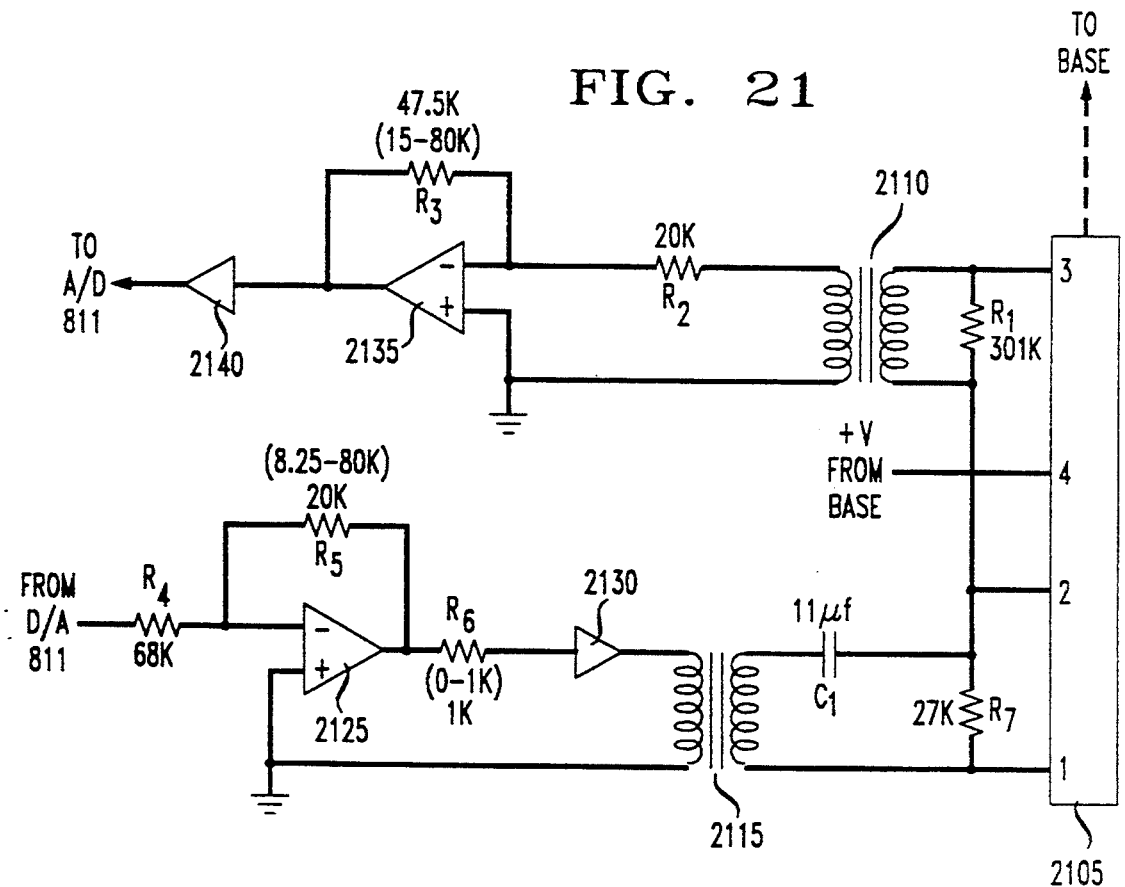

FIG. 21 presents a further detailed view of the illustrative base interface 1912 of plug-in module 1910. Connector 2105 couples a telephone base (not shown) to the base interface of module 1910. As with handset connector 2005, connector 2105 comprises four coupling pins (1–4). Pin 4 is left as an open circuit since it carries a power supply voltage from the telephone base. Pin 3 provides a receiver signal intended for the handset receiver. Pin 2 provides a common ground. Pin 1 provides a transmitter signal from the handset microphone to the base. Transformers 2110 and 2115 provide d.c. isolation between the base and the TSD and make the base interface polarity insensitive.

As shown, base interface 1910 will operate with many AT&T phone bases. However, the configuration of FIG. 21 may be adapted to conform to the requirements of other phone bases. For example, some bases provide a handset power supply voltage on pin 1 and expect transmit output signals on pin 4. Thus, the couplings of these pins may be exchanged. In such a case, pin 1 would be an open circuit and pin 4 would provide the transmitter output. Under the circumstances where pin 1 is an open circuit, pin 2 cannot be a common ground. As such, pin 3 serves as the common ground instead and pin 2 provides the receiver signal to the handset. Other bases do not provide for a common ground or a supply voltage. In such a case, e.g., pins 1 and 4 may be used to carry the signal voltage across the 27K ohm resistor and pins 2 and 3 may be used to carry the signal voltage across transformer 2110. The gains of amplifiers 2125 and 2135 are varied by adjusting resistors $R_5$ and $R_3$, respectively. These amplifiers adjust the level of signals coming to and from the base. Amplifiers 2130 and 2140 are conventional buffers. (All amplifiers shown in FIGS. 20 and 21 may be provided with conventional operational amplifier circuitry.)

It will be readily apparent to those of ordinary skill in the art that the handset interface of module 19 10 may be replaced by other interfaces suitable for coupling the core components 1920 with other devices, such as speaker phones, cellular phones, fax machines, computers, etc. Also, separate plug-in modules could be provided for the handset and base interfaces. Buffer amplifiers 2020, 2030, 2130, 2140 illustrated in FIGS. 20 and 21 may be located with cone components 1920, rather than in module 1920.

An STD may be used as an interface for coupling any of various communications devices (which ordinarily require a 2-wire telephone "line" coupling, such as fax machines, computers, etc.) to a 4-wire telephone base jack. In this case, the STD would include a 4-wire interface as discussed above for coupling the STD to the handset jack of the telephone base and a conventional 2-to-4 wire interface for coupling such a communications device to the STD. Assuming the communications device sends and receives modulated non-voice signals, modem 809 and speech codec 805 are removed from the STD signal path (either literally or logically). Thus, the STD may be advantageously employed to couple a conventional communications device having analog output signalling over two wires to digital subscriber loops (to which the telephone base is connected).

The STDs of FIGS. 8 and 19 employ digital encryption of a compressed digital speech signal. Alternatively, the STD could be realized with an analog scrambler. In such a realization, digital/analog converters 811, 803, modem 809, cryptographic system 807, and speech codec 807 would be replaced by a single analog scrambler device, such as the EPU (Embeddable Privacy Unit) analog scrambler available from DATOTEK Corp. An STD with an analog scrambler would include a base interface 1912/813 and a handset interface 801/1914. Each of these interfaces is adapted to the electrical characteristics of the handset and base, as well as the scrambler, in a fashion similar to that discussed above. Naturally, these interfaces may be removable, as discussed above.

The interface features of the STD provide useful functionality in addition to their use as pan of a security device. Specifically, the STD interface circuitry may be used to interface various communication devices to a telephone base even if encryption is not provided. As stated above, the interface circuitry may be removable. In the capacity of an interface, the STD need include no other special circuitry since electrical compatibility is the feature to be provided. Illustratively, such an embodiment would include conventional jacks to couple the STD between the devices/systems to be interfaced, an internal coupling connecting these jacks to a removable interface connector, and interface circuitry coupled to the connector. In this way, such devices/systems are coupled through the removable interface of the STD. It will be understood that the STD may include other components (such as, e.g., a cryptographic system), but that in this interface capacity, such other components need not be operative.

While portions of the foregoing description mentioned voice calls, it is to be clearly understood that the present invention can be utilized as well in connection with the communication of all types of secure data. (As would be clear to those of ordinary skill in the art, in such configurations where speech is not communicated, the speech coder/decoder of the STD may be removed). For example, the invention is ideal for protecting transmissions between PCs and between PCs and mainframe computers. This application requires only that the STD interfaces to the communications device and the telephone equipment be appropriately modified, which is easily accomplished by persons of ordinary skill. (Note that such modified interfaces may be removable, as discussed above.) In the same vein, secure fax may be used to protect transmissions between fax machines and fax store and forward services. Authentication of receipt of the fax (to whom was fax the delivered) can also be provided. Thus, an STD may be used to convert a computer, fax, etc., to a secure communications device.

With respect to call billing, various arrangements are possible. For example, security node 150 may be arranged to capture originating and terminating ANI, and call duration information associated with each User I.D. #. This information, along with the main billing number are then passed to bill rating and formatting system 187, for processing based on the subscribers outbound calling plan and inclusion into the customer's bill. The call is rated based on the call flow between the originating and termination locations, not between originating location to security node to terminating location. Thus, the cost of delivering the call to and from security node 150 will typically be part of the encrypting/decrypting feature charge, and will not appear as an item on the subscribers billing statement. Billing will begin when answer supervision is provided from the called end to security node 150. Different billing arrangement may be used for subscriber initiated calls (i.e., secure-to-clear, secure-to-secure), in which the cost of the call can be applied to the calling subscriber's bill, as compared to clear-to-secure calls, for which the called subscriber will assume responsibility for the cost of the call (as if it were a collect call).

Finally, while the preceding description illustrates switch 151 and controller 152 as separate apparatus, it is envisioned that a single "intelligent switch" capable of monitoring calls, issuing voice prompts and collecting responses, storing information, making connections under the control of stored programs, and performing various associated functions, can be disposed within the telecommunications network and used instead.

We claim:

1. A method of establishing a secure communication path through a network, the path for use in coupling premise equipment of a calling party with premise equipment of a called party with use of a network node, the premise equipment of the calling party and the network node having a cryptographic system, the method comprising the steps of:

the calling party's premise equipment transmitting first signals to the network node, the first signals for use in establishing in the network a clear communication path between the calling party's premise equipment and the network node;

the calling party's premise equipment transmitting second signals to the network node, the second signals for use in converting the clear communication path between the network node and the calling party's premise equipment to a secure communication path;

the calling party's premise equipment transmitting third signals to the network node via the secure communication path, the third signals comprising a telephone number associated with the called party for use in establishing a communications path between the network node and the premise equipment of the called party.

2. The method of claim 1 wherein the calling party's premise equipment comprises a telephone base, a telephone microphone, and a secure telephone device coupled between the base and the microphone.

3. The method of claim 2 wherein the secure telephone device includes a keypad and wherein the third signals are generated with use of the keypad.

4. The method of claim 1 wherein the step of transmitting second signals comprises the step of the calling party's premise equipment performing a cryptographic key exchange with the network node.

5. The method of claim 4 wherein the step of performing a cryptographic key exchange is initiated by the calling party's premise equipment.

6. The method of claim 1 wherein the premise equipment of the called party includes a cryptographic system and wherein the communication path between the premise equipment of the called party and the network node is a secure communication path.

7. A method of establishing a secure communication path through a network, the path for use in coupling premise equipment of a calling party with premise equipment of a called party with use of a network node, the premise equipment of the calling party and the network node having a cryptographic system premise equipment of the calling party coupled to the node by a clear communication path, the method comprising the steps of:

receiving at the network node first signals from the premise equipment of the calling party, the first signals for use in converting the clear communication path to a secure communication path;

receiving at the network node via the secure communication path second signals from tho calling party's premise equipment, the second signals comprising a telephone number associated with the called party; and establishing a communications path between the network node and the premise equipment of the called party based on the second signals.

8. The method of claim 7 wherein the calling party's premise equipment comprises a telephone base, a telephone microphone, and a secure telephone device coupled between the base and the microphone.

9. The method of claim 7 wherein the step of converting comprises the step of performing a cryptographic key exchange between the calling party's premise equipment and the network node.

10. The method of claim 9 wherein the step of performing a cryptographic key exchange is initiated by the network node.

11. The method of claim 7 wherein the premise equipment of the called party includes a cryptographic system and wherein the communication path between the premise equipment of the called party and the network node is a secure communication path.

* * * * *